US011871459B2

(12) United States Patent
Höglund et al.

(10) Patent No.: US 11,871,459 B2
(45) Date of Patent: Jan. 9, 2024

(54) MTC RACH REPORT EXTENSION

(71) Applicant: Telefonaktiebolaget LM Ericsson (publ), Stockholm (SE)

(72) Inventors: Andreas Höglund, Solna (SE); Yutao Sui, Solna (SE); Olof Liberg, Enskede (SE); Magnus Stattin, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 292 days.

(21) Appl. No.: 17/280,981

(22) PCT Filed: Sep. 24, 2019

(86) PCT No.: PCT/SE2019/050913
§ 371 (c)(1),
(2) Date: Mar. 29, 2021

(87) PCT Pub. No.: WO2020/067975
PCT Pub. Date: Apr. 2, 2020

(65) Prior Publication Data
US 2021/0360710 A1    Nov. 18, 2021

Related U.S. Application Data

(60) Provisional application No. 62/737,570, filed on Sep. 27, 2018.

(51) Int. Cl.
*H04W 74/08* (2009.01)
*H04W 4/70* (2018.01)
*H04W 52/36* (2009.01)

(52) U.S. Cl.
CPC ......... *H04W 74/0858* (2013.01); *H04W 4/70* (2018.02); *H04W 52/365* (2013.01)

(58) Field of Classification Search
CPC .. H04W 74/0858; H04W 4/70; H04W 52/365
(Continued)

(56) References Cited

U.S. PATENT DOCUMENTS

| | | | |
|---|---|---|---|
| 6,697,346 B1 * | 2/2004 | Halton | H04B 7/216 370/335 |
| 2014/0098693 A1 * | 4/2014 | Tabet | H04W 36/00837 370/252 |

(Continued)

FOREIGN PATENT DOCUMENTS

| | | |
|---|---|---|
| EP | 3166354 A1 | 5/2017 |
| JP | 2016500214 A | 1/2016 |

(Continued)

OTHER PUBLICATIONS

Huawei, et al., "R2-1709335: Enhanced UP solution for early data transmission in MTC," 3GPP TSG RAN WG2 Meeting #99, Aug. 21-25, 2017, Berlin, Germany, 4 pages.

(Continued)

*Primary Examiner* — Mark G. Pannell
(74) *Attorney, Agent, or Firm* — Withrow & Terranova, PLLC

(57) ABSTRACT

Systems and methods are disclosed herein for providing Early Data Transmission (EDT) information and Coverage Enhancement (CE) information to a base station and obtaining and using this information at a base station. Embodiments of a method performed by a wireless device and corresponding embodiments of a wireless device are disclosed. In some embodiments, a method performed by a wireless device for reporting radio conditions during random access comprises transmitting a message or report to a base station, the message or report comprising CE information, EDT information, or both the CE information and the EDT information. In this manner, the base station is provided information that can be used by the base station to optimize (Continued)

performance of the random access procedure. Embodiments of a method performed by a base station and corresponding embodiments of a base station are also disclosed.

19 Claims, 10 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2015/0117187 | A1* | 4/2015 | Zhu | H04W 48/08 370/252 |
| 2017/0078907 | A1 | 3/2017 | Wu | |
| 2019/0028905 | A1* | 1/2019 | Veeramallu | H04W 76/18 |
| 2021/0219163 | A1* | 7/2021 | Sha | H04W 76/18 |
| 2021/0219166 | A1* | 7/2021 | Morozov | H04L 1/203 |
| 2021/0282191 | A1* | 9/2021 | Chang | H04W 16/18 |

FOREIGN PATENT DOCUMENTS

| | | |
|---|---|---|
| JP | 2019212957 A | 12/2019 |
| WO | 2016163475 A1 | 10/2016 |
| WO | 2018104843 A1 | 6/2018 |
| WO | 2019018831 A1 | 1/2019 |

OTHER PUBLICATIONS

Notice of Reasons for Refusal for Japanese Patent Application No. 2021-517010, dated May 30, 2022, 20 pages.
Author Unknown, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," 3GPP TS 36.300 V15.2.0, Jun. 2018, 3GPP Organizational Partners, 357 pages.
Author Unknown, "3rd Generation Partnership Project; Technical Specification Group Radio Access Network; Evolved Universal Terrestrial Radio Access (E-UTRA); Radio Resource Control (RRC); Protocol specification (Release 15)," 3GPP TS 36.331 V.15.2.2, Jun. 2018, 3GPP Organizational Partners, 791 pages.
Ericsson et al., "RP-171427: Revised WID on Even further enhanced MTC for LTE," 3GPP TSG RAN Meeting #76, Jun. 5-8, 2017, West Palm Beach, USA, 4 pages.
Huawei et al., "RP-171428: Revised WID on Further NB-IoT enhancements," 3GPP TSG RAN Meeting #76, Jun. 5-8, 2017, West Palm Beach, USA, 5 pages.
Samsung, "R1-1809527: Feature summary of 6.2.1.5 Support of quality report in Msg3," 3GPP TSG RAN WG1 Meeting #94, Aug. 20-24, 2018, Gothenburg, Sweden, 10 pages.
International Search Report and Written Opinion for International Patent Application No. PCT/SE2019/050913, dated Nov. 27, 2019, 14 pages.
Notice of Reasons for Refusal for Japanese Patent Application No. 2021-517010, dated Feb. 3, 2023, 10 pages.
Examination Report for European Patent Application No. 19779218. 7, dated Aug. 31, 2022, 7 pages.

* cited by examiner

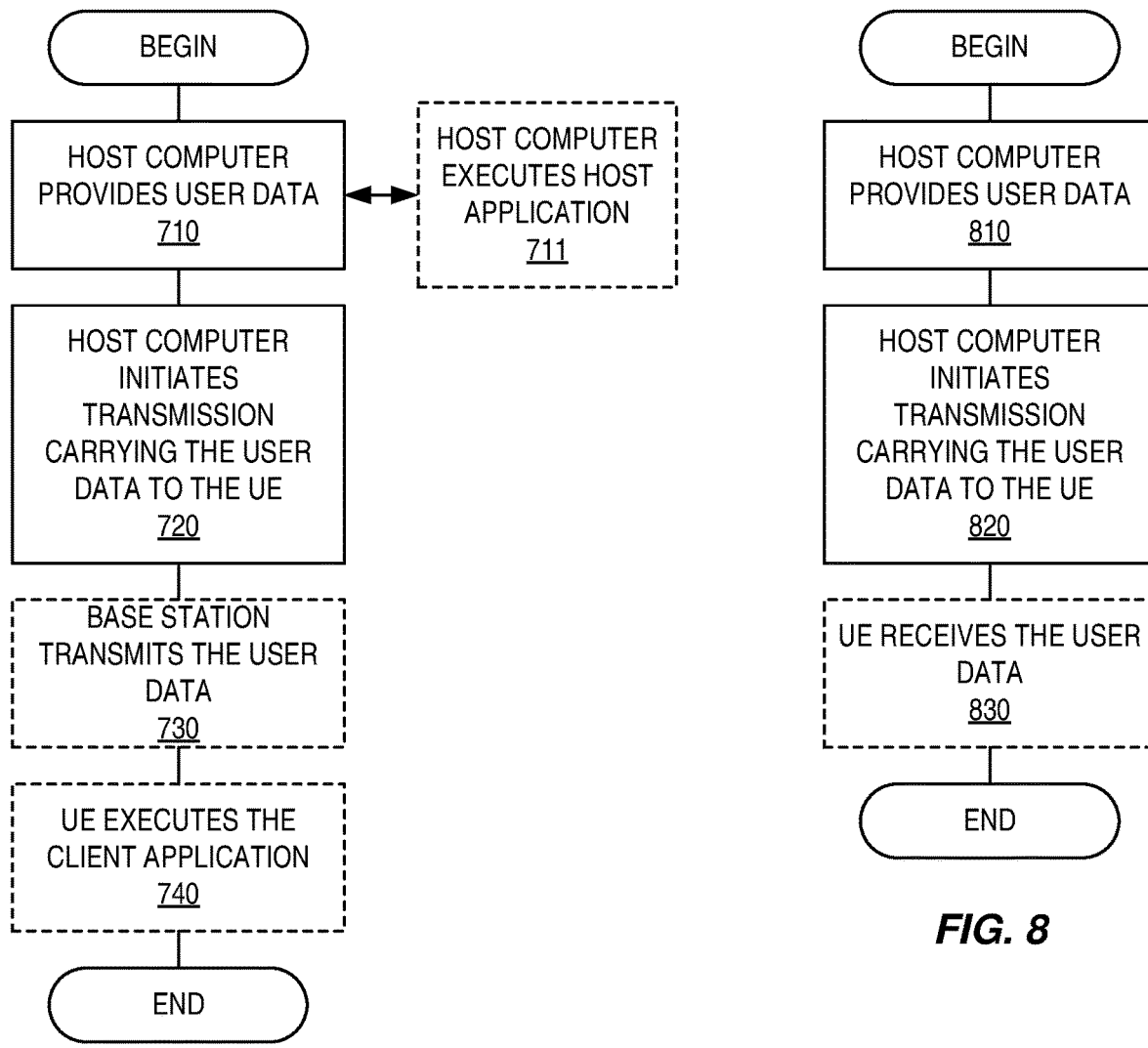

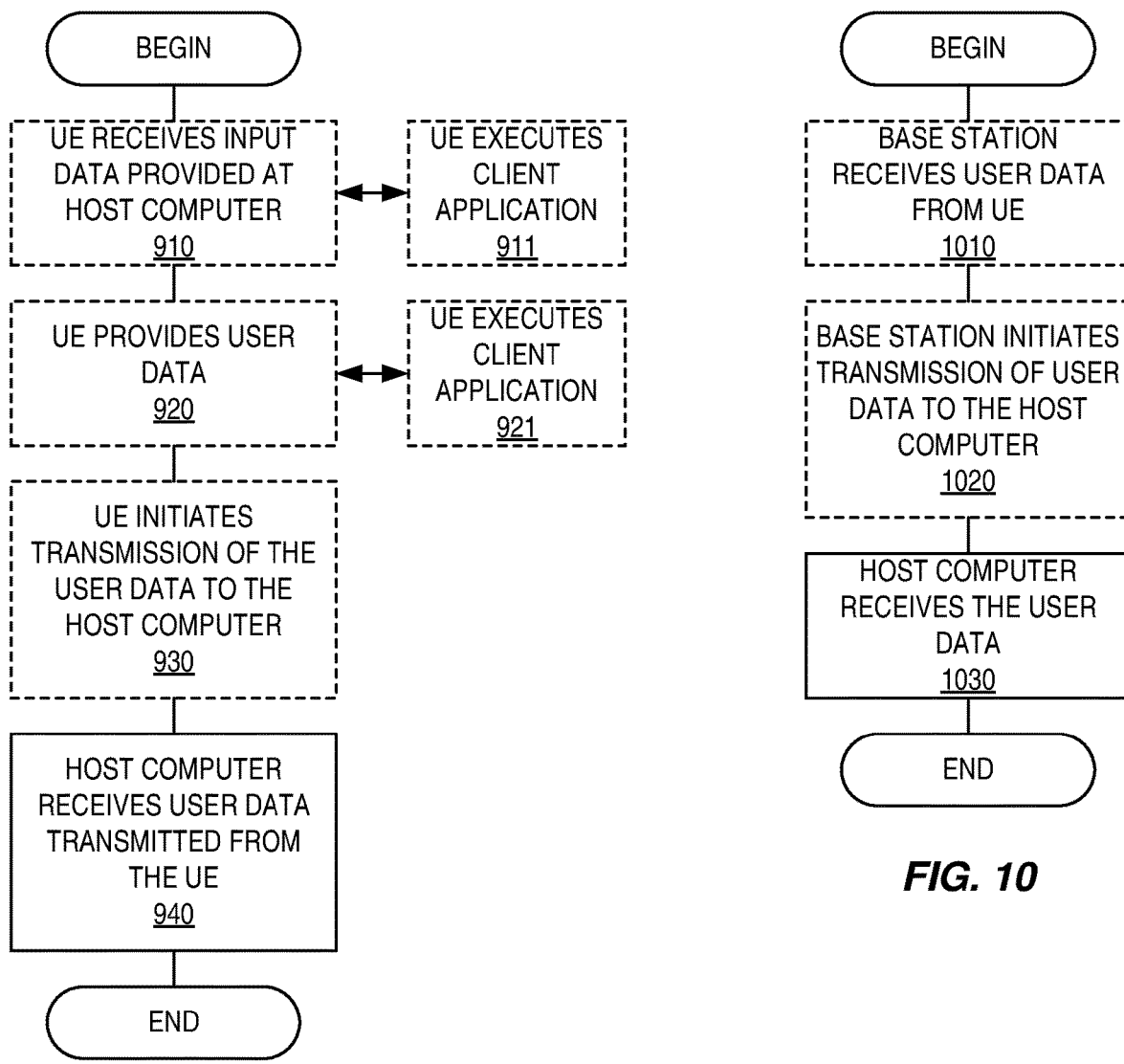

MTC RACH REPORT EXTENSION

RELATED APPLICATIONS

This application is a 35 U.S.C. § 371 national phase filing of International Application No. PCT/SE2019/050913, filed Sep. 24, 2019, which claims the benefit of provisional patent application Ser. No. 62/737,570, filed Sep. 27, 2018, the disclosures of which are hereby incorporated herein by reference in their entireties.

TECHNICAL FIELD

The present disclosure relates to random access procedure in a cellular communications system.

BACKGROUND

There has been a lot of work in the 3$^{rd}$ Generation Partnership Project (3GPP) on specifying technologies to cover Machine-to-Machine (M2M) and/or Internet of Things (IoT) related use cases. Most recent work for 3GPP Release 13, 14, and 15 includes Long Term Evolution (LTE) enhancements to support Machine-Type Communications (MTC) with new User Equipment (UE) categories (Cat-M1, Cat-M2), supporting reduced bandwidth of up to 6 and 24 Physical Resource Blocks (PRBs), and Narrowband IoT (NB-IoT) UEs providing a new radio interface (and UE categories Cat-NB1 and Cat-NB2).

The LTE enhancements introduced in 3GPP Release 13, 14, and 15 for MTC are referred to herein as enhanced MTC (eMTC) or LTE for MTC (LTE-M), including (not limiting) support for bandwidth limited UEs, Cat-M1, and support for coverage enhancements. This is to separate discussions from NB-IoT (notation here used for any Release), although the supported features are similar on a general level.

For both eMTC and NB-IoT, 'Cellular IoT (CIoT) Evolved Packet System (EPS) User Plane (UP) optimization' and 'CIoT EPS Control Plane (CP) optimization' signaling reductions were also introduced in Release 13. CIoT EPS UP optimization, here referred to as UP-solution, allows the UE to resume a previously stored Radio Resource Control (RRC) connection (thus also known as RRC Suspend/Resume). CIoT EPS CP optimization, here referred to as CP-solution, allows the transmission of user-plane Data Over Non-Access Stratum (DoNAS).

For 3GPP Release 15, new Work Items (WIs) "Even further enhanced MTC for LTE (LTE_eMTC4)" [WI_eMTC] and "Further NB-IoT enhancements (NB_IO-Tenh2)" [WI_NBIOT] target eMTC and NB-IoT enhancements, respectively. In both of these WIs, a common goal is to reduce UE power consumption and latency through introducing possibilities to send data as early as possible during the Random Access (RA) procedure:

From [WI_eMTC]:
Support early data transmission [RAN2 lead, RAN1, RAN3]
Evaluate power consumption/latency gain and specify necessary support for Downlink (DL)/Uplink (UL) data transmission on a dedicated resource during the RA procedure (after Physical Random Access Channel (PRACH) transmission and before the RRC connection setup is completed) at least in the RRC Suspend/Resume case.

And from [WI_NBIOT]:
Evaluate power consumption/latency gain and specify necessary support for DL/UL data transmission on a dedicated resource during the RA procedure after Narrowband PRACH (NPRACH) transmission and before the RRC connection setup is completed. [RAN2, RAN1, RAN3]

Certain embodiments may provide one or more of the following technical advantages. The benefit of the solution is that the configuration can be optimized based on the UE reporting to improve performance. For example, the size of a PRACH partition, or the time-frequency resources for Msg1 data transmission, can be adjusted to reduce the collision rate and at the same time not unnecessarily waste radio resources and degrade spectral efficiency.

SUMMARY

Systems and methods are disclosed herein for providing Early Data Transmission (EDT) information and Coverage Enhancement (CE) information to a base station and obtaining and using this information at a base station. Embodiments of a method performed by a wireless device and corresponding embodiments of a wireless device are disclosed. In some embodiments, a method performed by a wireless device for reporting radio conditions during random access comprises transmitting a message or report to a base station, the message or report comprising CE information, EDT information, or both the CE information and the EDT information. In this manner, the base station is provided information that can be used by the base station to optimize performance of the random access procedure (e.g., adjust the size of a Physical RACH (PRACH) partition and/or the time-frequency resources for Msg1 data transmission to reduce collision rates without unnecessarily wasting radio resources or degrading spectral efficiency).

In some embodiments, the method further comprises receiving a report request from the base station, wherein transmitting the message or report comprises transmitting the message or report in response to the report request. In some embodiments, the method further comprises initiating a random access procedure with the base station prior to receiving the report request. In some embodiments, initiating the random access procedure comprises transmitting a number of preamble messages to the base station until the report request is received. In some embodiments, the message or report comprises the number of preamble messages sent to the base station. In some embodiments, transmitting the message or report comprises transmitting the message or report after a threshold number of unsuccessful random access attempts.

In some embodiments, the EDT information comprises a number of EDT preamble messages sent to the base station, an indication that an EDT contention with another wireless device is detected, or both the number of EDT preamble messages sent to the base station and the indication that an EDT contention with another wireless device is detected. In some embodiments, the EDT information is included in the message or report after successfully transmitting an EDT message.

In some examples, the CE information comprises a CE level of the wireless device. In some embodiments, the CE information further comprises a number of preamble messages sent to the base station at the CE level, an indication that a contention with another wireless device is detected at the CE level, or both the number of preamble messages sent to the base station at the CE level and the indication that a contention with another wireless device is detected at the CE level.

In some embodiments, the message or report is a RACH report or a PRACH report.

In some embodiments, the message or report comprises PRACH coverage levels attempted before a successful random access attempt.

In some embodiments, the message or report comprises any one or any combination of two or more of: a number of PRACH preamble repetitions transmitted to the base station, information indicating whether the wireless device has had a previous unsuccessful random access attempt, power-class specific information, a power headroom report, multi-tone specific information, Narrowband PRACH (NPRACH) specific information, or information related to Radio Resource Control (RRC) Idle Msg1 data transmission in a random access procedure.

In some embodiments, the message or report is a Narrowband Internet of Things (NB-IoT) report. In some other embodiments, the message or report is an enhanced Machine Type Communication (eMTC) report.

In some embodiments, wireless device for reporting radio conditions during random access is adapted to transmit a message or report to a base station, the message or report comprising CE information, EDT information, or both the CE information and the EDT information.

Embodiments of a method performed by a base station and corresponding embodiments of a base station are also disclosed. In some embodiments, a method performed by a base station for improving throughput in response to reported radio conditions during random access comprises requesting a report from a wireless device. The method further comprises receiving the report from the wireless device, the report comprising CE information, EDT information, or both the CE information and the EDT information.

In some embodiments, the method further comprises adjusting a communication protocol parameter based on the CE information, the EDT information, or both the CE information and the EDT information. In some embodiments, the report comprises an indication of a collision rate for EDT communications. In some embodiments, adjusting the communication protocol parameter comprises adjusting an EDT channel partition based on the collision rate. In some embodiments, the collision rate is indicated by a number of unsuccessful EDT transmission attempts.

In some embodiments, the method further comprises receiving a random access initiation from the wireless device prior to requesting the report. In some embodiments, the method further comprises determining a threshold number of failed random access attempts occurred due to inclusion of the CE information, the EDT information, or both the CE information and the EDT information.

In some embodiments, the message or report is a RACH report or a PRACH report.

In some embodiments, the message or report comprises any one or any combination of two or more of: a number of PRACH preamble repetitions transmitted to the base station, information indicating whether the wireless device has had a previous unsuccessful random access attempt, power-class specific information, a power headroom report, multi-tone specific information, Narrowband PRACH (NPRACH) specific information, or information related to Radio Resource Control (RRC) Idle Msg1 data transmission in a random access procedure.

In some embodiments, a base station for improving throughput in response to reported radio conditions during random access is adapted to request a report from a wireless device and receive the report from the wireless device, the report comprising CE information, EDT information, or both the CE information and the EDT information.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 7 is a flowchart illustrating a method implemented in a communication system, in accordance with one embodiment.

FIG. 8 is a flowchart illustrating a method implemented in a communication system, in accordance with one embodiment.

FIG. 9 is a flowchart illustrating a method implemented in a communication system, in accordance with one embodiment.

FIG. 10 is a flowchart illustrating a method implemented in a communication system, in accordance with one embodiment.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Systems and methods are disclosed herein for providing Early Data Transmission (EDT) information and Coverage Enhancement (CE) information to a base station and obtaining and using this information at a base station. In some embodiments, systems and methods for extending a Random Access Channel (RACH) report for Machine Type Communications (MTC) are provided. In this regard, in some embodiments, User Equipment (UE) reporting is extended to include Early Data Transmission (EDT)-specific and Coverage Enhancement (CE)-specific information which a base station, such as an Evolved Node B (eNB) can use to optimize performance of the Random Access (RA) procedure. For example, with the extended report the base station can adjust the size of a Physical RACH (PRACH) partition and/or the time-frequency resources for Msg1 data transmission to reduce collision rates without unnecessarily wasting radio resources or degrading spectral efficiency.

Figure 1:
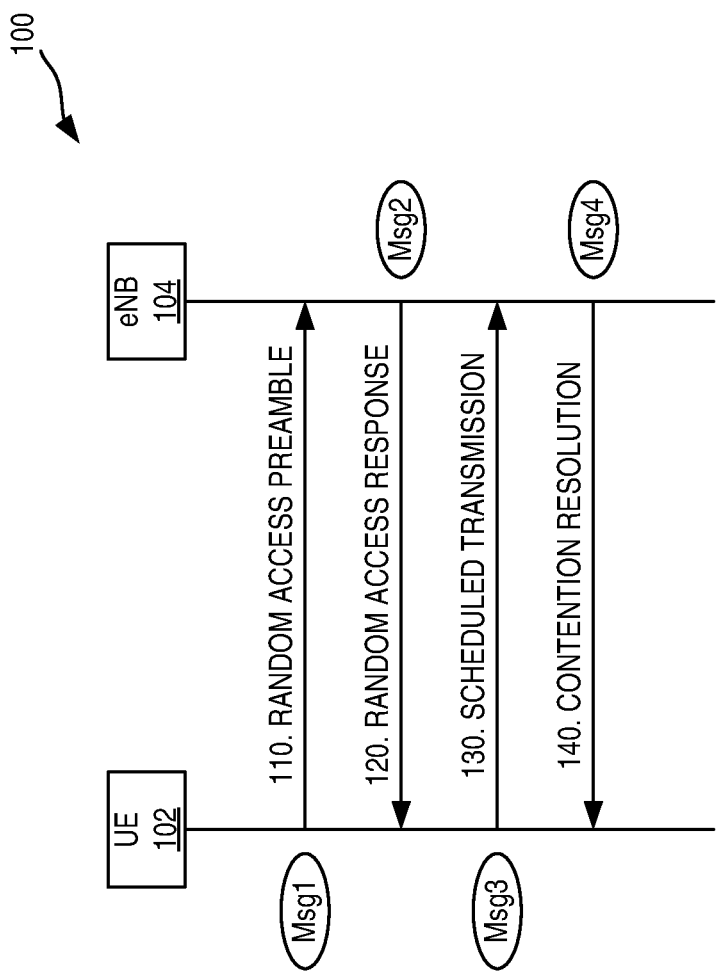
FIG. 1 depicts a flow diagram of messages in a Random Access (RA) procedure between a User Equipment (UE) and an Evolved Node B (eNB).

FIG. 1 depicts a flow diagram of messages in a RA procedure 100 between a UE 102 and an eNB 104. In this regard, FIG. 1 illustrates a contention based RA procedure 100 which is based on the Third Generation Partnership Project (3GPP) TS 36.300. To facilitate the description of the presented solutions, the messages in the RA procedure 100 are commonly referred to as Message 1 (Msg1) through Message 4 Msg4). The RA procedure 100 may begin with Msg1, which includes a RA Preamble being transmitted from the UE 102 to the eNB 104 (step 110). The eNB 104 responds with Msg2, which includes a RA Response (step 120). The RA procedure 100 continues with Msg3, which includes a scheduled transmission transmitted from the UE 102 to the eNB 104 (step 130). The eNB 104 responds with Msg4, which includes a contention resolution message (step 140).

EDT was introduced in Release 15. Using EDT, and in the solution the UE 102 can, unlike for the legacy connection setup procedure, transmit data beginning in Msg3 and/or receive data beginning in Msg4. If the UE 102 intends to transmit EDT data in Msg3, it will select a special EDT preamble (PRACH partitioning) and is allowed to use a transport block size according to the EDT configuration in system information. In Msg4, it is up to the eNB 104 to move the UE 102 to RRC_CONNECTED mode or RRC_IDLE mode.

In Release 16, 3GPP continues work on Narrowband Internet of Things (NB-IoT) and Long Term Evolution (LTE) for MTC (LTE-M). One objective in Release 16 targets to further reduce the latency by introducing Radio Resource Control (RRC) Idle data transmission in the first uplink message (Msg1). This can be seen as a natural evolution of the Release 15 EDT feature.

There currently exist certain challenges. EDT, Msg1 data transmission, and CE are MTC-specific features which are configurable over a wide range. However, the eNB 104 has no or little information to base the configuration on and it is therefore in practice very difficult to optimize the performance.

Certain aspects of the present disclosure and their embodiments may provide solutions to these or other challenges. In this regard, UE reporting is extended to include EDT-specific (covering both Release 15 and the Release 16 enhancement) and CE-specific information which the eNB 104 can use to optimize the RA performance.

The RA procedure 100 is generally performed according to communication protocol parameters set by the eNB 104. The eNB 104 bases these parameters, in part, on one or more RACH reports received from the UE 102 in response to a report request. In an exemplary embodiment, the RACH report is extended to also include EDT-specific and CE-specific information from the UE 102.

Both the Release 13 CE feature and the Release 15 EDT feature use preamble partitioning (both applicable to NB-IoT and LTE-M). Under Release 13 CE, the UE 102 determines its current coverage level (which is also sometimes referred to herein as "CE level") by a Reference Signal Received Power (RSRP) measurement and selects a (N)PRACH resource according to the measurement thresholds signaled in system information. Note that the term "(N)PRACH" is used herein to denote PRACH or Narrowband PRACH (NPRACH). The eNB 104 configures the (N)PRACH resources accordingly, with a number of repetitions to ensure the preamble transmission and full RA procedure 100 is successful. Under Release 15 EDT, the UE 102 selects a preamble from the EDT (N)PRACH partition if the UE 102 has the intention to use EDT and its Msg3 payload fits the EDT transport block size signaled in system information. If the previous (N)PRACH attempts failed, the UE 102 increases its power, and tries to send the preamble again. If after several attempts in the same coverage level fails, the UE 102 ramps up to a different coverage level (e.g., with additional repetitions), and uses the (N)PRACH resources in that coverage level to attempt to access the system.

In both of the above cases, the UE 102 may experience some problems, for example several collisions and unsuccessful attempts before a successful attempt. In one embodiment of the present disclosure, EDT-specific and/or CE-specific information is added to the RACH report from the UE 102 to the eNB 104. From this, the eNB 104 could, for example, conclude that there is a high collision rate in a certain CE level and increase the size of that (N)PRACH partition to improve performance. Alternatively, the eNB 104 could conclude the number of repetitions used by an (N)PRACH partition of a specific coverage level can be further optimized to accommodate more UEs 102, as some UEs 102 may not need to ramp up coverage levels.

Since the main purpose of EDT is to decrease the signaling for transmitting small data payloads, a high collision rate on the EDT (N)PRACH resources can be devastating since it may result in worse performance than without EDT. Therefore, the solution proposed herein is particularly beneficial for configuring EDT to be practically useful.

An Abstract Syntax Notation One (ASN.1) example of how this could be implemented in 3GPP 36.331 for LTE-M is produced below. The implementation for NB-IoT would be similar. Note that for NB-IoT, the UE 102 information procedure is not supported currently, i.e. UEInformationRequest and UEInformationResponse, and would have to be introduced.

With respect to the ASN.1 example, the UEInformationResponse message is used by the UE 102 to transfer the information requested by the Evolved Universal Terrestrial Radio Access Network (E-UTRAN) (e.g., in a RACH report request). The signalling radio bearer is denoted as SRB1 or SRB2 (when logged measurement information is included). The Radio Link Control (RLC)-Service Access Point (SAP) is configured in Acknowledged Mode (AM). The logical channel is the Dedicated Control Channel (DCCH). The direction of the UEInformationResponse is UE 102 to E-UTRAN (e.g., eNB 104). The ASN.1 example follows:

| UEInformationResponse message |
|---|

```
-- ASN1START
UEInformationResponse-r9   ::=              SEQUENCE {
    rrc-TransactionIdentifier               RRC-TransactionIdentifier,
    criticalExtensions                      CHOICE {
        c1                                      CHOICE {
            ueInformationResponse-r9                UEInformationResponse-
r9-IEs,
            spare3 NULL, spare2 NULL, spare1 NULL
        },
        criticalExtensionsFuture            SEQUENCE { }
    }
}
UEInformationResponse-r9-IEs ::=            SEQUENCE {
    rach-Report-r9                              SEQUENCE {
        numberOfPreamblesSent-r9                    NumberOfPreamblesSent-r11,
        contentionDetected-r9                       BOOLEAN
    }
                    OPTIONAL,
    rlf-Report-r9                               RLF-Report-r9
            OPTIONAL,
    nonCriticalExtension                        UEInformationResponse-v930-IEs
            OPTIONAL
}
-- Late non critical extensions
UEInformationResponse-v9e0-IEs ::= SEQUENCE {
    rlf-Report-v9e0                             RLF-Report-v9e0
            OPTIONAL,
    nonCriticalExtension                        SEQUENCE { }
            OPTIONAL
}
-- Regular non critical extensions
UEInformationResponse-v930-IEs ::=          SEQUENCE {
    lateNonCriticalExtension                    OCTET STRING (CONTAINING
UEInformationResponse-v9e0-IEs)         OPTIONAL,
    nonCriticalExtension                        UEInformationResponse-v1020-IEs
            OPTIONAL
}
UEInformationResponse-v1020-IEs ::= SEQUENCE {
    logMeasReport-r10                           LogMeasReport-r10
            OPTIONAL,
    nonCriticalExtension                        UEInformationResponse-v1130-IEs
            OPTIONAL
}
UEInformationResponse-v1130-IEs :: = SEQUENCE {
    connEstFailReport-r11                       ConnEstFailReport-r11
            OPTIONAL,
    nonCriticalExtension                        UEInformationResponse-v1250-IEs
            OPTIONAL
}
UEInformationResponse-v1250-IEs ::= SEQUENCE {
    mobilityHistoryReport-r12                   MobilityHistoryReport-r12
            OPTIONAL,
    nonCriticalExtension                        UEInformationResponse-vXY-IEs OPTIONAL
}
UEInformationResponse-vXY-IEs ::= SEQUENCE {
    EDT-rach-Report-rX                          SEQUENCE {
        Edt-numberOfPreamblesSent-r9                NumberOfPreamblesSent-r11,
        Edt-contentionDetected-r9                   BOOLEAN
    }
                            OPTIONAL,
    ce-rach-ReportList-rX                       CE-rach-ReportList-rX
        OPTIONAL,
    nonCriticalExtension                        SEQUENCE { }
        OPTIONAL
}
CE-rach-ReportList-rX ::=           SEQUENCE (SIZE(1..maxCE-Level-r13)) OF CE-rach-Report-rX
CE-rach-Report-rX ::=               SEQUENCE {
    ce-numberOfPreamblesSent-r9                 NumberOfPreamblesSent-r11
        OPTIONAL,
    ce-contentionDetected-r9                    BOOLEAN
        OPTIONAL
}
RLF-Report-r9 ::=                   SEQUENCE {
    measResultLastServCell-r9                   SEQUENCE {
        rsrpResult-r9                               RSRP-Range,
        rsrqResult-r9                               RSRQ-Range
            OPTIONAL
    },
```

-continued

| UEInformationResponse message | |
|---|---|
| measResultNeighCells-r9 | SEQUENCE { |
|     measResultListEUTRA-r9 | MeasResultList2EUTRA-r9 |
| OPTIONAL, | |
|     measResultListUTRA-r9 | MeasResultList2UTRA-r9 |
| OPTIONAL, | |
|     measResultListGERAN-r9 | MeasResultListGERAN |
| OPTIONAL, | |
|     measResultsCDMA2000-r9 | MeasResultList2CDMA2000-r9 |
| OPTIONAL | |
| }   OPTIONAL, | |
| ..., | |
| : | |
| : | |
| -- ASN1STOP | |

Thus, in the above embodiment the UE 102 (e.g., a wireless device) transmits a RACH report to the eNB 104 (e.g., a base station) which includes CE information, EDT information, or both the CE information and the EDT information. In alternative embodiments, the information could be contained in any other message or UE report.

In an alternative embodiment, the UE 102 only sends the information after a certain number of unsuccessful (N)PRACH attempts (e.g., after a threshold number of unsuccessful RA attempts). Or, the numberOfPreamblesSent can be quantized to indicate a given range to reduce the number of bits that is used for the reporting.

In an alternative embodiment, positioning-specific information for the use of (N)PRACH for Uplink Time Difference of Arrival (UTDOA) positioning can be included in the RACH report or in other UE reporting.

In an alternative embodiment, the UE 102 may indicate whether it has tried other (N)PRACH coverage levels before its successful attempt. In NB-IoT Release 14, support is added for NPRACH configuration and RA also on non-anchor carriers. In yet an alternative embodiment of the above, carrier-specific information could be added to the RACH report or to other UE reporting. For example, the UE 102 could indicate the carrier with which it has had unsuccessful RA attempts in the report.

In Release 13, UEs 102 can be of power classes corresponding to either 20 dBm or 23 dBm output power. In Release 14, support is added for 14 dBm power class for NB-IoT. In Release 15, support is added for 14 dBm power class for LTE-M. In yet an alternative embodiment of the above, power class-specific information could be added to the RACH report or to other UE reporting.

In an alternative embodiment, the UE 102 may include its Power Headroom Report (PHR), i.e., the difference between its maximum power and the actual power used to send the (N)PRACH preambles in the report.

In Release 13 NB-IoT, the support for multi-tone transmission of Msg3 is also indicated by NPRACH partitioning. In yet an alternative embodiment of the above, multi-tone-specific information could be added to the RACH report or to other UE reporting.

In Release 15 NB-IoT, a new NPRACH for reliability and range enhancement is introduced (a new sequence extending the range up to 120 km cell radius and better suppressing inter-cell interference). In yet an alternative embodiment of the above, Release 15 NPRACH-specific information could be added to the RACH report or to other UE reporting.

In yet another embodiment information related to the Release 16 RRC Idle Msg1 data transmission is included in the UE reporting to the network. Parameters to report include, but are not limited to, the used Timing Advance (TA) value in the Msg1 transmission, the CE and power level for the (N)PUSCH transmission (wherein "(N) PUSCH" is used herein to denote Physical Uplink Shared Channel (PUSCH) or Narrowband PUSCH (NPUSCH)), the Transport Block Size (TBS) used, and the Msg1 Block Error Rate (BLER). This would be related to the Work Item objective on improved uplink efficiency and transmission in preconfigured resources. Note that in this case the report would be used by the eNB 104 to optimize the configuration of these preconfigured resources and not of (N)PRACH.

Figure 2:
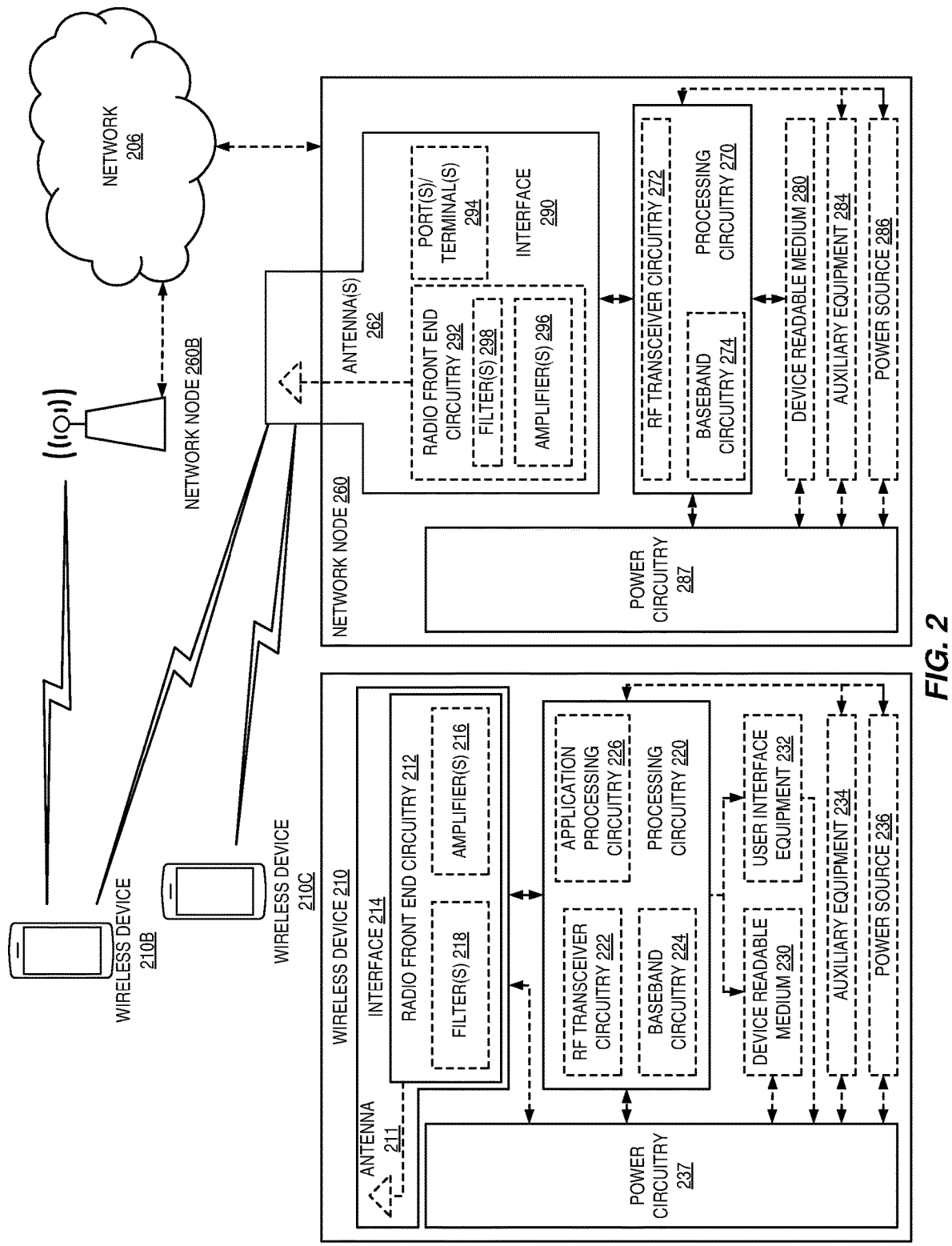
FIG. 2 illustrates an example of a wireless network in which embodiments of the present disclosure may be implemented.

Although the subject matter described herein may be implemented in any appropriate type of system using any suitable components, the embodiments disclosed herein are described in relation to a wireless network, such as the example wireless network illustrated in FIG. 2. For simplicity, the wireless network of FIG. 2 only depicts a network 206, network nodes 260 and 260B, and Wireless Devices (WDs) 210, 210B, and 210C. In practice, a wireless network may further include any additional elements suitable to support communication between wireless devices or between a wireless device and another communication device, such as a landline telephone, a service provider, or any other network node or end device. Of the illustrated components, the network node 260 and the WD 210 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), LTE, and/or other suitable Second, Third, Fourth, or Fifth Generation (2G, 3G, 4G, or 5G) standards; Wireless Local Area Network (WLAN) standards, such as the IEEE 802.11 standards; and/or any other appropriate wireless communication standard, such as the Worldwide Interoperability for Microwave Access (WiMax), Bluetooth, Z-Wave, and/or ZigBee standards.

The network 206 may comprise one or more backhaul networks, core networks, Internet Protocol (IP) networks, Public Switched Telephone Networks (PSTNs), packet data networks, optical networks, Wide Area Networks (WANs), Local Area Networks (LANs), WLANs, wired networks, wireless networks, metropolitan area networks, and other networks to enable communication between devices.

The network node 260 and the WD 210 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged, and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, Access Points (APs) (e.g., radio APs), base stations (e.g., radio base stations, Node Bs, eNBs (e.g., the eNB 104 of FIG. 1), and New Radio (NR) Node Bs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or Remote Radio Units (RRUs), sometimes referred to as Remote Radio Heads (RRHs). Such RRUs may or may not be integrated with an antenna as an antenna integrated radio. Parts of a distributed radio base station may also be referred to as nodes in a Distributed Antenna System (DAS). Yet further examples of network nodes include Multi-Standard Radio (MSR) equipment such as MSR base stations, network controllers such as Radio Network Controllers (RNCs) or Base Station Controllers (BSCs), Base Transceiver Stations (BTSs), transmission points, transmission nodes, Multi-Cell/Multicast Coordination Entities (MCEs), core network nodes (e.g., Mobile Switching Centers (MSCs), Mobility Management Entities (MMEs)), Operation and Maintenance (O&M) nodes, Operations Support System (OSS) nodes, Self-Organizing Network (SON) nodes, positioning nodes (e.g., Evolved Serving Mobile Location Center (E-SMLCs)), and/or Minimization of Drive Tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 2, the network node 260 includes processing circuitry 270, a device readable medium 280, an interface 290, auxiliary equipment 284, a power source 286, power circuitry 287, and an antenna 262. Although the network node 260 illustrated in the example wireless network of FIG. 2 may represent a device that includes the illustrated combination of hardware components, other embodiments may comprise network nodes with different combinations of components. It is to be understood that a network node comprises any suitable combination of hardware and/or software needed to perform the tasks, features, functions, and methods disclosed herein. Moreover, while the components of the network node 260 are depicted as single boxes located within a larger box, or nested within multiple boxes, in practice, a network node may comprise multiple different physical components that make up a single illustrated component (e.g., the device readable medium 280 may comprise multiple separate hard drives as well as multiple Random Access Memory (RAM) modules).

Similarly, the network node 260 may be composed of multiple physically separate components (e.g., a Node B component and a RNC component, or a BTS component and a BSC component, etc.), which may each have their own respective components. In certain scenarios in which the network node 260 comprises multiple separate components (e.g., BTS and BSC components), one or more of the separate components may be shared among several network nodes. For example, a single RNC may control multiple Node Bs. In such a scenario, each unique Node B and RNC pair may in some instances be considered a single separate network node. In some embodiments, the network node 260 may be configured to support multiple Radio Access Technologies (RATs). In such embodiments, some components may be duplicated (e.g., a separate device readable medium 280 for the different RATs) and some components may be reused (e.g., the same antenna 262 may be shared by the RATs). The network node 260 may also include multiple sets of the various illustrated components for different wireless technologies integrated into the network node 260, such as, for example, GSM, Wideband Code Division Multiple Access (WCDMA), LTE, NR, WiFi, or Bluetooth wireless technologies. These wireless technologies may be integrated into the same or a different chip or set of chips and other components within the network node 260.

The processing circuitry 270 is configured to perform any determining, calculating, or similar operations (e.g., certain obtaining operations) described herein as being provided by a network node. These operations performed by the processing circuitry 270 may include processing information obtained by the processing circuitry 270 by, for example, converting the obtained information into other information, comparing the obtained information or converted information to information stored in the network node, and/or performing one or more operations based on the obtained information or converted information, and as a result of said processing making a determination.

The processing circuitry 270 may comprise a combination of one or more of a microprocessor, a controller, a microcontroller, a Central Processing Unit (CPU), a Digital Signal Processor (DSP), an Application Specific Integrated Circuit (ASIC), a Field Programmable Gate Array (FPGA), or any other suitable computing device, resource, or combination of hardware, software, and/or encoded logic operable to provide, either alone or in conjunction with other network node 260 components, such as the device readable medium 280, network node 260 functionality. For example, the processing circuitry 270 may execute instructions stored in the device readable medium 280 or in memory within the processing circuitry 270. Such functionality may include providing any of the various wireless features, functions, or benefits discussed herein. In some embodiments, the processing circuitry 270 may include a System on a Chip (SOC).

In some embodiments, the processing circuitry 270 may include one or more of Radio Frequency (RF) transceiver circuitry 272 and baseband processing circuitry 274. In some embodiments, the RF transceiver circuitry 272 and the baseband processing circuitry 274 may be on separate chips (or sets of chips), boards, or units, such as radio units and digital units. In alternative embodiments, part or all of the RF transceiver circuitry 272 and the baseband processing circuitry 274 may be on the same chip or set of chips, boards, or units.

In certain embodiments, some or all of the functionality described herein as being provided by a network node, base station, eNB, or other such network device may be performed by the processing circuitry 270 executing instructions stored on the device readable medium 280 or memory within the processing circuitry 270. In alternative embodiments, some or all of the functionality may be provided by the processing circuitry 270 without executing instructions stored on a separate or discrete device readable medium, such as in a hard-wired manner. In any of those embodiments, whether executing instructions stored on a device readable storage medium or not, the processing circuitry 270 can be configured to perform the described functionality. The benefits provided by such functionality are not limited to the processing circuitry 270 alone or to other components of the network node 260, but are enjoyed by the network node 260 as a whole, and/or by end users and the wireless network generally.

The device readable medium 280 may comprise any form of volatile or non-volatile computer readable memory including, without limitation, persistent storage, solid state memory, remotely mounted memory, magnetic media, optical media, RAM, Read Only Memory (ROM), mass storage media (for example, a hard disk), removable storage media (for example, a flash drive, a Compact Disk (CD) or a Digital Versatile Disk (DVD)), and/or any other volatile or non-volatile, non-transitory device readable and/or computer-executable memory devices that store information, data, and/or instructions that may be used by the processing circuitry 270. The device readable medium 280 may store any suitable instructions; data or information, including a computer program; software; an application including one or more of logic, rules, code, tables, etc.; and/or other instructions capable of being executed by the processing circuitry 270 and utilized by the network node 260. The device readable medium 280 may be used to store any calculations made by the processing circuitry 270 and/or any data received via the interface 290. In some embodiments, the processing circuitry 270 and the device readable medium 280 may be considered to be integrated.

The interface 290 is used in the wired or wireless communication of signaling and/or data between the network node 260, the network 206, and/or WDs 210. As illustrated, the interface 290 comprises port(s)/terminal(s) 294 to send and receive data, for example to and from the network 206 over a wired connection. The interface 290 also includes radio front end circuitry 292 that may be coupled to, or in certain embodiments a part of, the antenna 262. The radio front end circuitry 292 comprises filters 298 and amplifiers 296. The radio front end circuitry 292 may be connected to the antenna 262 and the processing circuitry 270. The radio front end circuitry 292 may be configured to condition signals communicated between the antenna 262 and the processing circuitry 270. The radio front end circuitry 292 may receive digital data that is to be sent out to other network nodes or WDs via a wireless connection. The radio front end circuitry 292 may convert the digital data into a radio signal having the appropriate channel and bandwidth parameters using a combination of the filters 298 and/or the amplifiers 296. The radio signal may then be transmitted via the antenna 262. Similarly, when receiving data, the antenna 262 may collect radio signals which are then converted into digital data by the radio front end circuitry 292. The digital data may be passed to the processing circuitry 270. In other embodiments, the interface 290 may comprise different components and/or different combinations of components.

In certain alternative embodiments, the network node 260 may not include separate radio front end circuitry 292; instead, the processing circuitry 270 may comprise radio front end circuitry and may be connected to the antenna 262 without separate radio front end circuitry 292. Similarly, in some embodiments, all or some of the RF transceiver circuitry 272 may be considered a part of the interface 290. In still other embodiments, the interface 290 may include the port(s)/terminal(s) 294, the radio front end circuitry 292, and the RF transceiver circuitry 272 as part of a radio unit (not shown), and the interface 290 may communicate with the baseband processing circuitry 274, which is part of a digital unit (not shown).

The antenna 262 may include one or more antennas, or antenna arrays, configured to send and/or receive wireless signals. The antenna 262 may be coupled to the radio front end circuitry 292 and may be any type of antenna capable of transmitting and receiving data and/or signals wirelessly. In some embodiments, the antenna 262 may comprise one or more omni-directional, sector, or panel antennas operable to transmit/receive radio signals between, for example, 2 gigahertz (GHz) and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as Multiple Input Multiple Output (MIMO). In certain embodiments, the antenna 262 may be separate from the network node 260 and may be connectable to the network node 260 through an interface or port.

The antenna 262, the interface 290, and/or the processing circuitry 270 may be configured to perform any receiving operations and/or certain obtaining operations described herein as being performed by a network node. Any information, data, and/or signals may be received from a WD, another network node, and/or any other network equipment. Similarly, the antenna 262, the interface 290, and/or the processing circuitry 270 may be configured to perform any transmitting operations described herein as being performed by a network node. Any information, data, and/or signals may be transmitted to a WD, another network node, and/or any other network equipment.

The power circuitry 287 may comprise, or be coupled to, power management circuitry and is configured to supply the components of the network node 260 with power for performing the functionality described herein. The power circuitry 287 may receive power from the power source 286. The power source 286 and/or the power circuitry 287 may be configured to provide power to the various components of the network node 260 in a form suitable for the respective components (e.g., at a voltage and current level needed for each respective component). The power source 286 may either be included in, or be external to, the power circuitry 287 and/or the network node 260. For example, the network node 260 may be connectable to an external power source (e.g., an electricity outlet) via an input circuitry or interface such as an electrical cable, whereby the external power source supplies power to the power circuitry 287. As a further example, the power source 286 may comprise a source of power in the form of a battery or battery pack which is connected to, or integrated in, the power circuitry 287. The battery may provide backup power should the external power source fail. Other types of power sources, such as photovoltaic devices, may also be used.

Alternative embodiments of the network node 260 may include additional components beyond those shown in FIG. 2 that may be responsible for providing certain aspects of the network node's functionality, including any of the functionality described herein and/or any functionality necessary to support the subject matter described herein. For example, the network node 260 may include user interface equipment to allow input of information into the network node 260 and to allow output of information from the network node 260. This may allow a user to perform diagnostic, maintenance, repair, and other administrative functions for the network node 260.

As used herein, WD refers to a device capable, configured, arranged, and/or operable to communicate wirelessly with network nodes and/or other WDs. Unless otherwise noted, the term WD may be used interchangeably herein with UE (e.g., the UE 102 of FIG. 1). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a Voice over IP (VoIP) phone, a wireless local loop phone, a desktop computer, a Personal Digital Assistant (PDA), a wireless camera, a gaming console or device, a music storage device, a playback appliance, a wearable terminal device, a wireless endpoint, a mobile station, a tablet, a laptop, Laptop Embedded Equipment (LEE), Laptop Mounted Equipment (LME), a smart device, a wireless Customer Premise Equipment (CPE), a vehicle mounted wireless terminal device, etc. A WD may support Device-to-Device (D2D) communication, for example by implementing a 3GPP standard for sidelink communication, Vehicle-to-Vehicle (V2V), Vehicle-to-Infrastructure (V2I), Vehicle-to-Everything (V2X), and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a Machine-to-Machine (M2M) device, which may in a 3GPP context be referred to as a MTC device. As one particular example, the WD may be a UE implementing the 3GPP NB-IoT standard. Particular examples of such machines or devices are sensors, metering devices such as power meters, industrial machinery, home or personal appliances (e.g., refrigerators, televisions, etc.), or personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated in FIG. 2, the WD 210 includes an antenna 211, an interface 214, processing circuitry 220, a device readable medium 230, user interface equipment 232, auxiliary equipment 234, a power source 236, and power circuitry 237. The WD 210 may include multiple sets of one or more of the illustrated components for different wireless technologies supported by the WD 210, such as, for example, GSM, WCDMA, LTE, NR, WiFi, WiMAX, or Bluetooth wireless technologies, just to mention a few. These wireless technologies may be integrated into the same or different chips or set of chips as other components within the WD 210.

The antenna 211 may include one or more antennas or antenna arrays configured to send and/or receive wireless signals and is connected to the interface 214. In certain alternative embodiments, the antenna 211 may be separate from the WD 210 and be connectable to the WD 210 through an interface or port. The antenna 211, the interface 214, and/or the processing circuitry 220 may be configured to perform any receiving or transmitting operations described herein as being performed by a WD. Any information, data, and/or signals may be received from a network node and/or another WD. In some embodiments, radio front end circuitry and/or the antenna 211 may be considered an interface.

As illustrated, the interface 214 comprises radio front end circuitry 212 and the antenna 211. The radio front end circuitry 212 comprises one or more filters 218 and amplifiers 216. The radio front end circuitry 212 is connected to the antenna 211 and the processing circuitry 220 and is configured to condition signals communicated between the antenna 211 and the processing circuitry 220. The radio front end circuitry 212 may be coupled to or be a part of the antenna 211. In some embodiments, the WD 210 may not include separate radio front end circuitry 212; rather, the processing circuitry 220 may comprise radio front end circuitry and may be connected to the antenna 211. Similarly, in some embodiments, some or all of RF transceiver circuitry 222 may be considered a part of the interface 214. The radio front end circuitry 212 may receive digital data that is to be sent out to other network nodes or WDs via a wireless connection. The radio front end circuitry 212 may convert the digital data into a radio signal having the appropriate channel and bandwidth parameters using a combination of the filters 218 and/or the amplifiers 216. The radio signal may then be transmitted via the antenna 211. Similarly, when receiving data, the antenna 211 may collect radio signals which are then converted into digital data by the radio front end circuitry 212. The digital data may be passed to the processing circuitry 220. In other embodiments, the interface 214 may comprise different components and/or different combinations of components.

The processing circuitry 220 may comprise a combination of one or more of a microprocessor, a controller, a microcontroller, a CPU, a DSP, an ASIC, a FPGA, or any other suitable computing device, resource, or combination of hardware, software, and/or encoded logic operable to provide, either alone or in conjunction with other WD 210 components, such as the device readable medium 230, WD 210 functionality. Such functionality may include providing any of the various wireless features or benefits discussed herein. For example, the processing circuitry 220 may execute instructions stored in the device readable medium 230 or in memory within the processing circuitry 220 to provide the functionality disclosed herein.

As illustrated, the processing circuitry 220 includes one or more of the RF transceiver circuitry 222, baseband processing circuitry 224, and application processing circuitry 226. In other embodiments, the processing circuitry 220 may comprise different components and/or different combinations of components. In certain embodiments, the processing circuitry 220 of the WD 210 may comprise a SOC. In some embodiments, the RF transceiver circuitry 222, the baseband processing circuitry 224, and the application processing circuitry 226 may be on separate chips or sets of chips. In alternative embodiments, part or all of the baseband processing circuitry 224 and the application processing circuitry 226 may be combined into one chip or set of chips, and the RF transceiver circuitry 222 may be on a separate chip or set of chips. In still alternative embodiments, part or all of the RF transceiver circuitry 222 and the baseband processing circuitry 224 may be on the same chip or set of chips, and the application processing circuitry 226 may be on a separate chip or set of chips. In yet other alternative embodiments, part or all of the RF transceiver circuitry 222, the baseband processing circuitry 224, and the application processing circuitry 226 may be combined in the same chip or set of chips. In some embodiments, the RF transceiver circuitry 222 may be a part of the interface 214. The RF transceiver circuitry 222 may condition RF signals for the processing circuitry 220.

In certain embodiments, some or all of the functionality described herein as being performed by a WD may be provided by the processing circuitry 220 executing instructions stored on the device readable medium 230, which in certain embodiments may be a computer-readable storage medium. In alternative embodiments, some or all of the functionality may be provided by the processing circuitry 220 without executing instructions stored on a separate or discrete device readable storage medium, such as in a hard-wired manner. In any of those particular embodiments, whether executing instructions stored on a device readable storage medium or not, the processing circuitry 220 can be configured to perform the described functionality. The benefits provided by such functionality are not limited to the processing circuitry 220 alone or to other components of the WD 210, but are enjoyed by the WD 210 as a whole, and/or by end users and the wireless network generally.

The processing circuitry 220 may be configured to perform any determining, calculating, or similar operations (e.g., certain obtaining operations) described herein as being performed by a WD. These operations, as performed by the processing circuitry 220, may include processing information obtained by the processing circuitry 220 by, for example, converting the obtained information into other information, comparing the obtained information or converted information to information stored by the WD 210, and/or performing one or more operations based on the obtained information or converted information, and as a result of said processing making a determination.

The device readable medium 230 may be operable to store a computer program; software; an application including one or more of logic, rules, code, tables, etc.; and/or other instructions capable of being executed by the processing circuitry 220. The device readable medium 230 may include computer memory (e.g., RAM or ROM), mass storage media (e.g., a hard disk), removable storage media (e.g., a CD or a DVD), and/or any other volatile or non-volatile, non-transitory device readable and/or computer executable memory devices that store information, data, and/or instructions that may be used by the processing circuitry 220. In some embodiments, the processing circuitry 220 and the device readable medium 230 may be considered to be integrated.

The user interface equipment 232 may provide components that allow for a human user to interact with the WD 210. Such interaction may be of many forms, such as visual, audial, tactile, etc. The user interface equipment 232 may be operable to produce output to the user and to allow the user to provide input to the WD 210. The type of interaction may vary depending on the type of user interface equipment 232 installed in the WD 210. For example, if the WD 210 is a smart phone, the interaction may be via a touch screen; if the WD 210 is a smart meter, the interaction may be through a screen that provides usage (e.g., the number of gallons used) or a speaker that provides an audible alert (e.g., if smoke is detected). The user interface equipment 232 may include input interfaces, devices and circuits, and output interfaces, devices and circuits. The user interface equipment 232 is configured to allow input of information into the WD 210, and is connected to the processing circuitry 220 to allow the processing circuitry 220 to process the input information. The user interface equipment 232 may include, for example, a microphone, a proximity or other sensor, keys/buttons, a touch display, one or more cameras, a Universal Serial Bus (USB) port, or other input circuitry. The user interface equipment 232 is also configured to allow output of information from the WD 210 and to allow the processing circuitry 220 to output information from the WD 210. The user interface equipment 232 may include, for example, a speaker, a display, vibrating circuitry, a USB port, a headphone interface, or other output circuitry. Using one or more input and output interfaces, devices, and circuits of the user interface equipment 232, the WD 210 may communicate with end users and/or the wireless network, and allow them to benefit from the functionality described herein.

The auxiliary equipment 234 is operable to provide more specific functionality which may not be generally performed by WDs. This may comprise specialized sensors for doing measurements for various purposes, interfaces for additional types of communication such as wired communications, etc. The inclusion and type of components of the auxiliary equipment 234 may vary depending on the embodiment and/or scenario.

The power source 236 may, in some embodiments, be in the form of a battery or battery pack. Other types of power sources, such as an external power source (e.g., an electricity outlet), photovoltaic devices, or power cells may also be used. The WD 210 may further comprise the power circuitry 237 for delivering power from the power source 236 to the various parts of the WD 210 which need power from the power source 236 to carry out any functionality described or indicated herein. The power circuitry 237 may in certain embodiments comprise power management circuitry. The power circuitry 237 may additionally or alternatively be operable to receive power from an external power source, in which case the WD 210 may be connectable to the external power source (such as an electricity outlet) via input circuitry or an interface such as an electrical power cable. The power circuitry 237 may also in certain embodiments be operable to deliver power from an external power source to the power source 236. This may be, for example, for the charging of the power source 236. The power circuitry 237 may perform any formatting, converting, or other modification to the power from the power source 236 to make the power suitable for the respective components of the WD 210 to which power is supplied.

Figure 3:
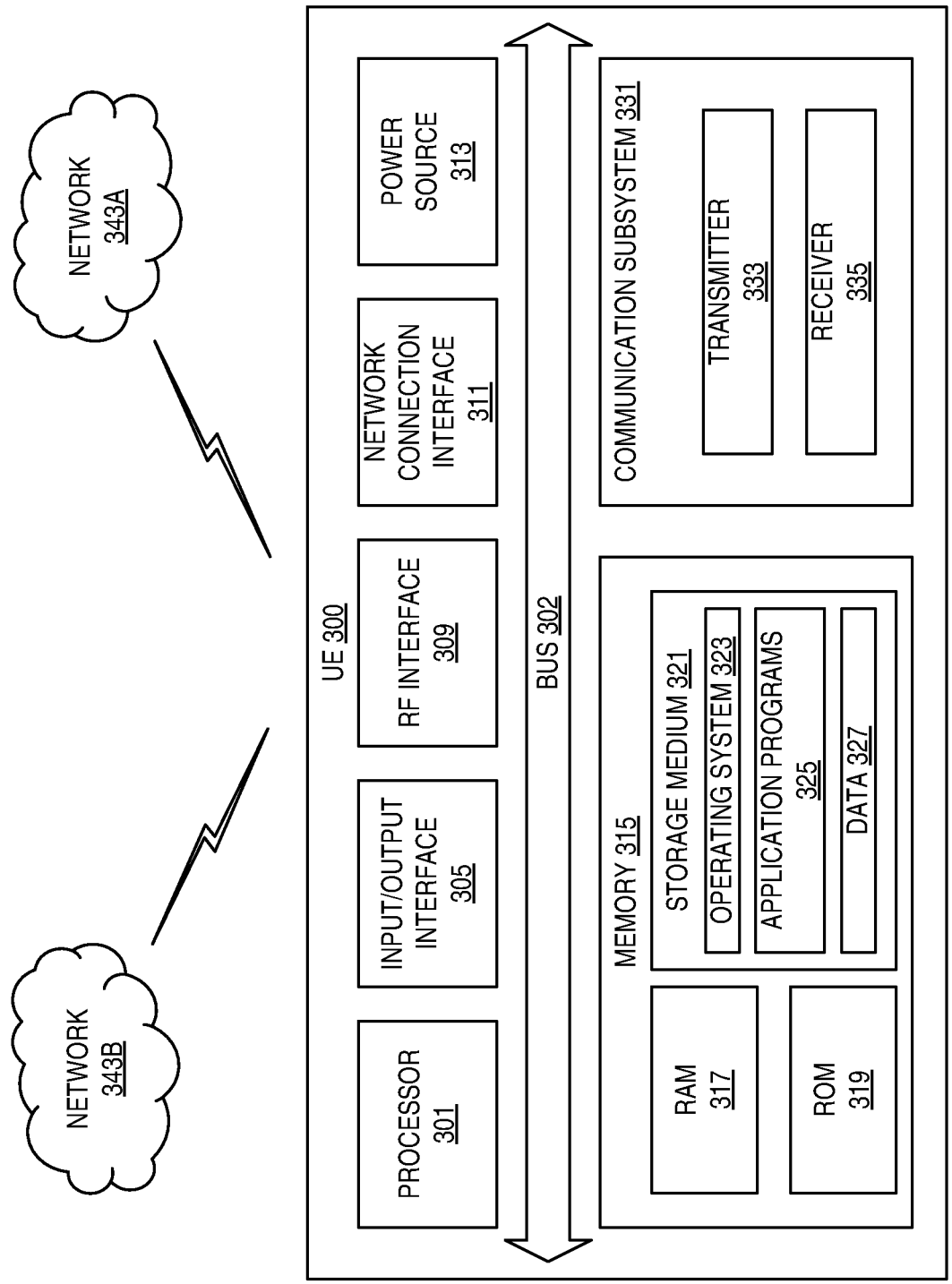
FIG. 3 illustrates one embodiment of a UE in accordance with various aspects described herein.

FIG. 3 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). A UE 300 may be any UE identified by 3GPP, including a NB-IoT UE, a MTC UE, and/or an Enhanced MTC (eMTC) UE. The UE 300, as illustrated in FIG. 3, is one example of a WD configured for communication in accordance with one or more communication standards promulgated by 3GPP, such as 3GPP's GSM, UMTS, LTE, and/or 5G standards. As mentioned previously, the term WD and UE may be used interchangeably. Accordingly, although FIG. 3 is a UE, the components discussed herein are equally applicable to a WD, and vice-versa.

In FIG. 3, the UE 300 includes processing circuitry 301 that is operatively coupled to an input/output interface 305, an RF interface 309, a network connection interface 311, memory 315 including RAM 317, ROM 319, and a storage medium 321 or the like, a communication subsystem 331, a power source 313, and/or any other component, or any combination thereof. The storage medium 321 includes an operating system 323, an application program 325, and data 327. In other embodiments, the storage medium 321 may include other similar types of information. Certain UEs may utilize all of the components shown in FIG. 3, or only a subset of the components. The level of integration between the components may vary from one UE to another UE. Further, certain UEs may contain multiple instances of a component, such as multiple processors, memories, transceivers, transmitters, receivers, etc.

In FIG. 3, the processing circuitry 301 may be configured to process computer instructions and data. The processing circuitry 301 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored programs, general purpose processors, such as a microprocessor or DSP, together with appropriate software; or any combination of the above. For example, the processing circuitry 301 may include two CPUs. Data may be information in a form suitable for use by a computer.

In the depicted embodiment, the input/output interface 305 may be configured to provide a communication interface to an input device, output device, or input and output device. The UE 300 may be configured to use an output device via the input/output interface 305. An output device may use the same type of interface port as an input device. For example, a USB port may be used to provide input to and output from the UE 300. The output device may be a speaker, a sound card, a video card, a display, a monitor, a printer, an actuator, an emitter, a smartcard, another output device, or any combination thereof. The UE 300 may be configured to use an input device via the input/output interface 305 to allow a user to capture information into the UE 300. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 3, the RF interface 309 may be configured to provide a communication interface to RF components such as a transmitter, a receiver, and an antenna. The network connection interface 311 may be configured to provide a communication interface to a network 343A. The network 343A may encompass wired and/or wireless networks such as a LAN, a WAN, a computer network, a wireless network, a telecommunications network, another like network or any combination thereof. For example, the network 343A may comprise a WiFi network. The network connection interface 311 may be configured to include a receiver and a transmitter interface used to communicate with one or more other devices over a communication network according to one or more communication protocols, such as Ethernet, Transmission Control Protocol (TCP)/IP, Synchronous Optical Networking (SONET), Asynchronous Transfer Mode (ATM), or the like. The network connection interface 311 may implement receiver and transmitter functionality appropriate to the communication network links (e.g., optical, electrical, and the like). The transmitter and receiver functions may share circuit components, software, or firmware, or alternatively may be implemented separately.

The RAM 317 may be configured to interface via a bus 302 to the processing circuitry 301 to provide storage or caching of data or computer instructions during the execution of software programs such as the operating system, application programs, and device drivers. The ROM 319 may be configured to provide computer instructions or data to the processing circuitry 301. For example, the ROM 319 may be configured to store invariant low-level system code or data for basic system functions such as basic Input and Output (I/O), startup, or reception of keystrokes from a keyboard that are stored in a non-volatile memory. The storage medium 321 may be configured to include memory such as RAM, ROM, Programmable ROM (PROM), Erasable PROM (EPROM), Electrically EPROM (EEPROM), magnetic disks, optical disks, floppy disks, hard disks, removable cartridges, or flash drives. In one example, the storage medium 321 may be configured to include the operating system 323, the application program 325 such as a web browser application, a widget or gadget engine, or another application, and the data 327. The storage medium 321 may store, for use by the UE 300, any of a variety of various operating systems or combinations of operating systems.

The storage medium 321 may be configured to include a number of physical drive units, such as a Redundant Array of Independent Disks (RAID), a floppy disk drive, flash memory, a USB flash drive, an external hard disk drive, a thumb drive, a pen drive, a key drive, a High-Density DVD (HD-DVD) optical disc drive, an internal hard disk drive, a Blu-Ray optical disc drive, a Holographic Digital Data Storage (HDDS) optical disc drive, an external mini-Dual In-Line Memory Module (DIMM), Synchronous Dynamic RAM (SDRAM), external micro-DIMM SDRAM, smartcard memory such as a Subscriber Identity Module (SIM) or a Removable User Identity Module (RUIM), other memory, or any combination thereof. The storage medium 321 may allow the UE 300 to access computer-executable instructions, application programs, or the like, stored on transitory or non-transitory memory media, to off-load data or to upload data. An article of manufacture, such as one utilizing a communication system, may be tangibly embodied in the storage medium 321, which may comprise a device readable medium.

In FIG. 3, the processing circuitry 301 may be configured to communicate with a network 343B using the communication subsystem 331. The network 343A and the network 343B may be the same network or networks or different network or networks. The communication subsystem 331 may be configured to include one or more transceivers used to communicate with the network 343B. For example, the communication subsystem 331 may be configured to include one or more transceivers used to communicate with one or more remote transceivers of another device capable of wireless communication such as another WD, UE, or base station of a Radio Access Network (RAN) according to one or more communication protocols, such as IEEE 802.3, Code Division Multiple Access (CDMA), WCDMA, GSM, LTE, Universal Terrestrial RAN (UTRAN), WiMax, or the like. Each transceiver may include a transmitter 333 and/or a receiver 335 to implement transmitter or receiver functionality, respectively, appropriate to the RAN links (e.g., frequency allocations and the like). Further, the transmitter 333 and the receiver 335 of each transceiver may share circuit components, software, or firmware, or alternatively may be implemented separately.

In the illustrated embodiment, the communication functions of the communication subsystem 331 may include data communication, voice communication, multimedia communication, short-range communications such as Bluetooth, near-field communication, location-based communication such as the use of the Global Positioning System (GPS) to determine a location, another like communication function, or any combination thereof. For example, the communication subsystem 331 may include cellular communication, WiFi communication, Bluetooth communication, and GPS communication. The network 343B may encompass wired and/or wireless networks such as a LAN, a WAN, a computer network, a wireless network, a telecommunications network, another like network, or any combination thereof. For example, the network 343B may be a cellular network, a WiFi network, and/or a near-field network. The power source 313 may be configured to provide Alternating Current (AC) or Direct Current (DC) power to components of the UE 300.

The features, benefits, and/or functions described herein may be implemented in one of the components of the UE 300 or partitioned across multiple components of the UE 300. Further, the features, benefits, and/or functions described herein may be implemented in any combination of hardware, software, or firmware. In one example, the communication subsystem 331 may be configured to include any of the components described herein. Further, the processing circuitry 301 may be configured to communicate with any of such components over the bus 302. In another example, any of such components may be represented by program instructions stored in memory that, when executed by the processing circuitry 301, perform the corresponding functions described herein. In another example, the functionality of any of such components may be partitioned between the processing circuitry 301 and the communication subsystem 331. In another example, the non-computationally intensive functions of any of such components may be implemented in software or firmware and the computationally intensive functions may be implemented in hardware.

Figure 4:
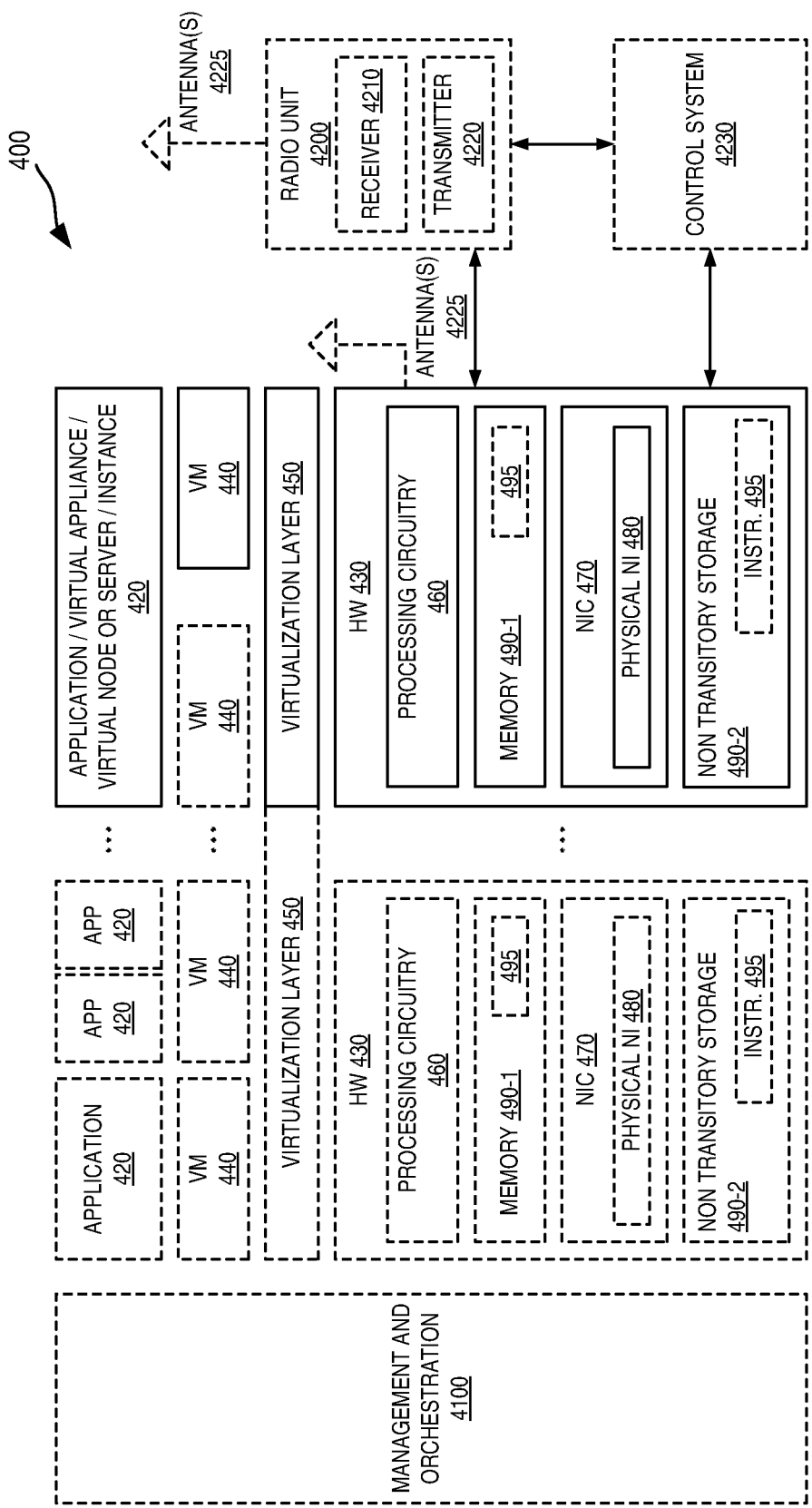
FIG. 4 is a schematic block diagram illustrating a virtualization environment in which functions implemented by some embodiments may be virtualized.

FIG. 4 is a schematic block diagram illustrating a virtualization environment 400 in which functions implemented by some embodiments may be virtualized. In the present context, virtualizing means creating virtual versions of apparatuses or devices which may include virtualizing hardware platforms, storage devices, and networking resources. As used herein, virtualization can be applied to a node (e.g., a virtualized base station or a virtualized radio access node) or to a device (e.g., a UE, a WD, or any other type of communication device) or components thereof and relates to an implementation in which at least a portion of the functionality is implemented as one or more virtual components (e.g., via one or more applications, components, functions, virtual machines, or containers executing on one or more physical processing nodes in one or more networks).

In some embodiments, some or all of the functions described herein may be implemented as virtual components executed by one or more virtual machines implemented in one or more virtual environments 400 hosted by one or more hardware nodes 430. Further, in embodiments in which the virtual node is not a radio access node or does not require radio connectivity (e.g., a core network node), then the network node may be entirely virtualized.

The functions may be implemented by one or more applications 420 (which may alternatively be called software instances, virtual appliances, network functions, virtual nodes, virtual network functions, etc.) operative to implement some of the features, functions, and/or benefits of some of the embodiments disclosed herein. The applications 420 are run in the virtualization environment 400 which provides hardware 430 comprising processing circuitry 460 and memory 490. The memory 490 contains instructions 495 executable by the processing circuitry 460 whereby the application 420 is operative to provide one or more of the features, benefits, and/or functions disclosed herein.

The virtualization environment 400 comprises general-purpose or special-purpose network hardware devices 430 comprising a set of one or more processors or processing circuitry 460, which may be Commercial Off-the-Shelf (COTS) processors, dedicated ASICs, or any other type of processing circuitry including digital or analog hardware components or special purpose processors. Each hardware device 430 may comprise memory 490-1 which may be non-persistent memory for temporarily storing instructions 495 or software executed by the processing circuitry 460. Each hardware device 430 may comprise one or more Network Interface Controllers (NICs) 470, also known as network interface cards, which include a physical network interface 480. Each hardware device 430 may also include non-transitory, persistent, machine-readable storage media 490-2 having stored therein software 495 and/or instructions executable by the processing circuitry 460. The software 495 may include any type of software including software for instantiating one or more virtualization layers 450 (also referred to as hypervisors), software to execute virtual machines 440, as well as software allowing it to execute functions, features, and/or benefits described in relation with some embodiments described herein.

The virtual machines 440, comprise virtual processing, virtual memory, virtual networking or interface, and virtual storage, and may be run by a corresponding virtualization layer 450 or hypervisor. Different embodiments of the instance of virtual appliance 420 may be implemented on one or more of the virtual machines 440, and the implementations may be made in different ways.

During operation, the processing circuitry 460 executes the software 495 to instantiate the hypervisor or virtualization layer 450, which may sometimes be referred to as a Virtual Machine Monitor (VMM). The virtualization layer 450 may present a virtual operating platform that appears like networking hardware to the virtual machine 440.

As shown in FIG. 4, the hardware 430 may be a standalone network node with generic or specific components. The hardware 430 may comprise an antenna 4225 and may implement some functions via virtualization. Alternatively, the hardware 430 may be part of a larger cluster of hardware (e.g., such as in a data center or CPE) where many hardware nodes work together and are managed via a Management and Orchestration (MANO) 4100, which, among others, oversees lifecycle management of the applications 420.

Virtualization of the hardware is in some contexts referred to as Network Function Virtualization (NFV). NFV may be used to consolidate many network equipment types onto industry standard high volume server hardware, physical switches, and physical storage, which can be located in data centers and CPE.

In the context of NFV, the virtual machine 440 may be a software implementation of a physical machine that runs programs as if they were executing on a physical, non-virtualized machine. Each of the virtual machines 440, and that part of the hardware 430 that executes that virtual machine 440, be it hardware dedicated to that virtual machine 440 and/or hardware shared by that virtual machine 440 with others of the virtual machines 440, forms a separate Virtual Network Element (VNE).

Still in the context of NFV, Virtual Network Function (VNF) is responsible for handling specific network functions that run in one or more virtual machines 440 on top of the hardware networking infrastructure 430 and corresponds to the application 420 in FIG. 4.

In some embodiments, one or more radio units 4200 that each include one or more transmitters 4220 and one or more receivers 4210 may be coupled to the one or more antennas 4225. The radio units 4200 may communicate directly with the hardware nodes 430 via one or more appropriate network interfaces and may be used in combination with the virtual components to provide a virtual node with radio capabilities, such as a radio access node or a base station.

In some embodiments, some signaling can be effected with the use of a control system 4230, which may alternatively be used for communication between the hardware nodes 430 and the radio unit 4200.

Figure 5:
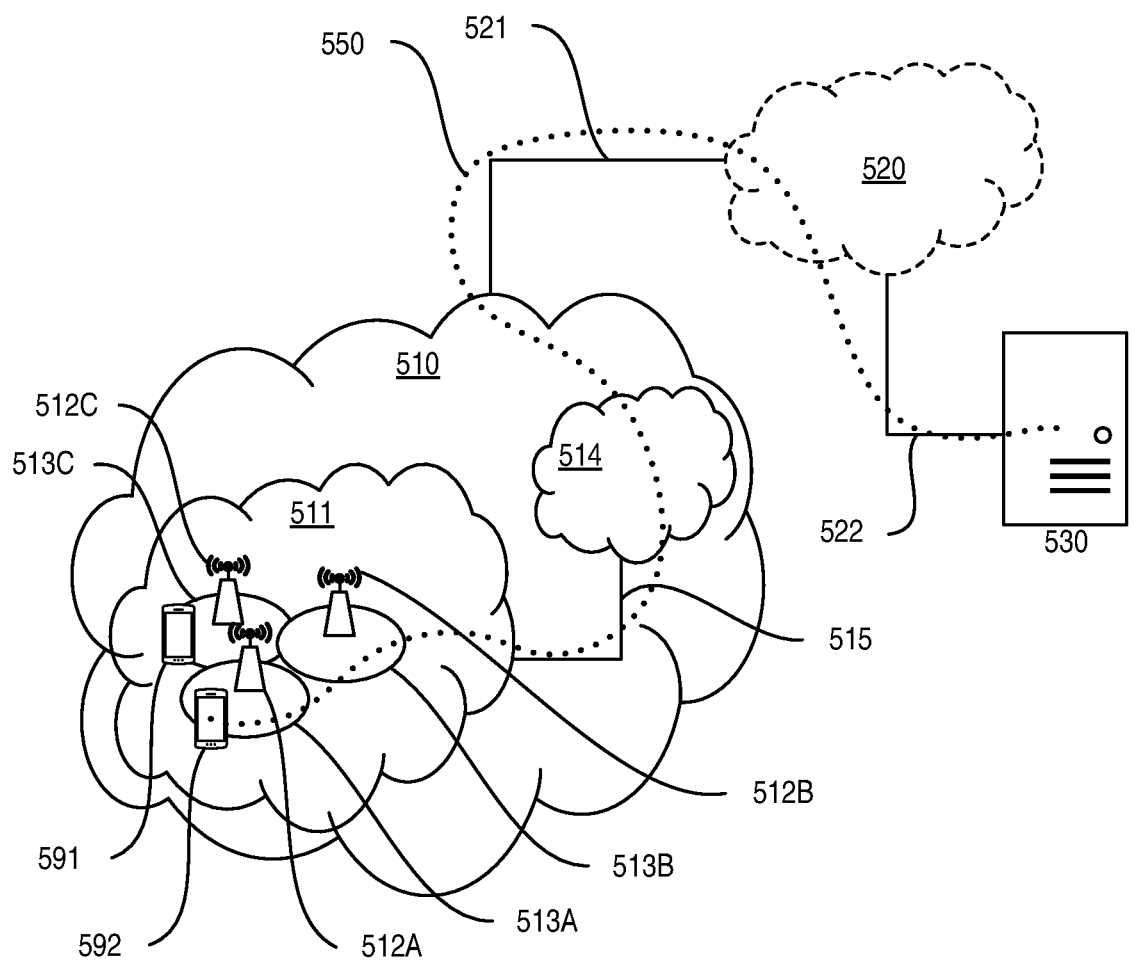
FIG. 5 illustrates an example communication system in which embodiments of the present disclosure may be implemented.

With reference to FIG. 5, in accordance with an embodiment, a communication system includes a telecommunication network 510, such as a 3GPP-type cellular network, which comprises an access network 511, such as a RAN, and a core network 514. The access network 511 comprises a plurality of base stations 512A, 512B, 512C, such as Node Bs, eNBs, gNBs, or other types of wireless APs, each defining a corresponding coverage area 513A, 513B, 513C. Each base station 512A, 512B, 512C is connectable to the core network 514 over a wired or wireless connection 515. A first UE 591, located in coverage area 513C, is configured to wirelessly connect to, or be paged by, the corresponding base station 512C. A second UE 592 in coverage area 513A is wirelessly connectable to the corresponding base station 512A. While a plurality of UEs 591, 592 are illustrated in this example, the disclosed embodiments are equally applicable to a situation where a sole UE is in the coverage area or where a sole UE is connecting to a corresponding base station 512.

The telecommunication network 510 is itself connected to a host computer 530, which may be embodied in the hardware and/or software of a standalone server, a cloud-implemented server, a distributed server, or as processing resources in a server farm. The host computer 530 may be under the ownership or control of a service provider, or may be operated by the service provider or on behalf of the service provider. Connections 521 and 522 between the telecommunication network 510 and the host computer 530 may extend directly from the core network 514 to the host computer 530 or may go via an optional intermediate network 520. The intermediate network 520 may be one of, or a combination of more than one of, a public, private, or hosted network; the intermediate network 520, if any, may be a backbone network or the Internet; in particular, the intermediate network 520 may comprise two or more sub-networks (not shown).

The communication system of FIG. 5 as a whole enables connectivity between the connected UEs 591, 592 and the host computer 530. The connectivity may be described as an Over-the-Top (OTT) connection 550. The host computer 530 and the connected UEs 591, 592 are configured to communicate data and/or signaling via the OTT connection 550, using the access network 511, the core network 514, any intermediate network 520, and possible further infrastructure (not shown) as intermediaries. The OTT connection 550 may be transparent in the sense that the participating communication devices through which the OTT connection 550 passes are unaware of routing of uplink and downlink communications. For example, the plurality of base stations 512A, 512B, 512C may not or need not be informed about the past routing of an incoming downlink communication with data originating from the host computer 530 to be forwarded (e.g., handed over) to a connected UE 591. Similarly, the plurality of base stations 512A, 512B, 512C need not be aware of the future routing of an outgoing uplink communication originating from the UE 591 towards the host computer 530.

Example implementations, in accordance with an embodiment, of the UE, base station, and host computer discussed in the preceding paragraphs will now be described with reference to FIG. 6. In a communication system 600, a host computer 610 comprises hardware 615 including a communication interface 616 configured to set up and maintain a wired or wireless connection with an interface of a different communication device of the communication system 600. The host computer 610 further comprises processing circuitry 618, which may have storage and/or processing capabilities. In particular, the processing circuitry 618 may comprise one or more programmable processors, ASICs, FPGAs, or combinations of these (not shown) adapted to execute instructions. The host computer 610 further comprises software 611, which is stored in or accessible by the host computer 610 and executable by the processing circuitry 618. The software 611 includes a host application 612. The host application 612 may be operable to provide a service to a remote user, such as a UE 630 connecting via an OTT connection 650 terminating at the UE 630 and the host computer 610. In providing the service to the remote user, the host application 612 may provide user data which is transmitted using the OTT connection 650.

The communication system 600 further includes a base station 620 provided in a telecommunication system and comprising hardware 625 enabling it to communicate with the host computer 610 and with the UE 630. The hardware 625 may include a communication interface 626 for setting up and maintaining a wired or wireless connection with an interface of a different communication device of the communication system 600, as well as a radio interface 627 for setting up and maintaining at least a wireless connection 670 with the UE 630 located in a coverage area (not shown in FIG. 6) served by the base station 620. The communication interface 626 may be configured to facilitate a connection 660 to the host computer 610. The connection 660 may be direct or it may pass through a core network (not shown in FIG. 6) of the telecommunication system and/or through one or more intermediate networks outside the telecommunication system. In the embodiment shown, the hardware 625 of the base station 620 further includes processing circuitry 628, which may comprise one or more programmable processors, ASICs, FPGAs, or combinations of these (not shown) adapted to execute instructions. The base station 620 further has software 621 stored internally or accessible via an external connection.

The communication system 600 further includes the UE 630 already referred to. Hardware 635 of the UE 630 may include a radio interface 637 configured to set up and maintain the wireless connection 670 with a base station serving a coverage area in which the UE 630 is currently located. The hardware 635 of the UE 630 further includes processing circuitry 638, which may comprise one or more programmable processors, ASICs, FPGAs, or combinations of these (not shown) adapted to execute instructions. The UE 630 further comprises software 631, which is stored in or accessible by the UE 630 and executable by the processing circuitry 638. The software 631 includes a client application 632. The client application 632 may be operable to provide a service to a human or non-human user via the UE 630, with the support of the host computer 610. In the host computer 610, the executing host application 612 may communicate with the executing client application 632 via the OTT connection 650 terminating at the UE 630 and the host computer 610. In providing the service to the user, the client application 632 may receive request data from the host application 612 and provide user data in response to the request data. The OTT connection 650 may transfer both the request data and the user data. The client application 632 may interact with the user to generate the user data that it provides.

Figure 6:
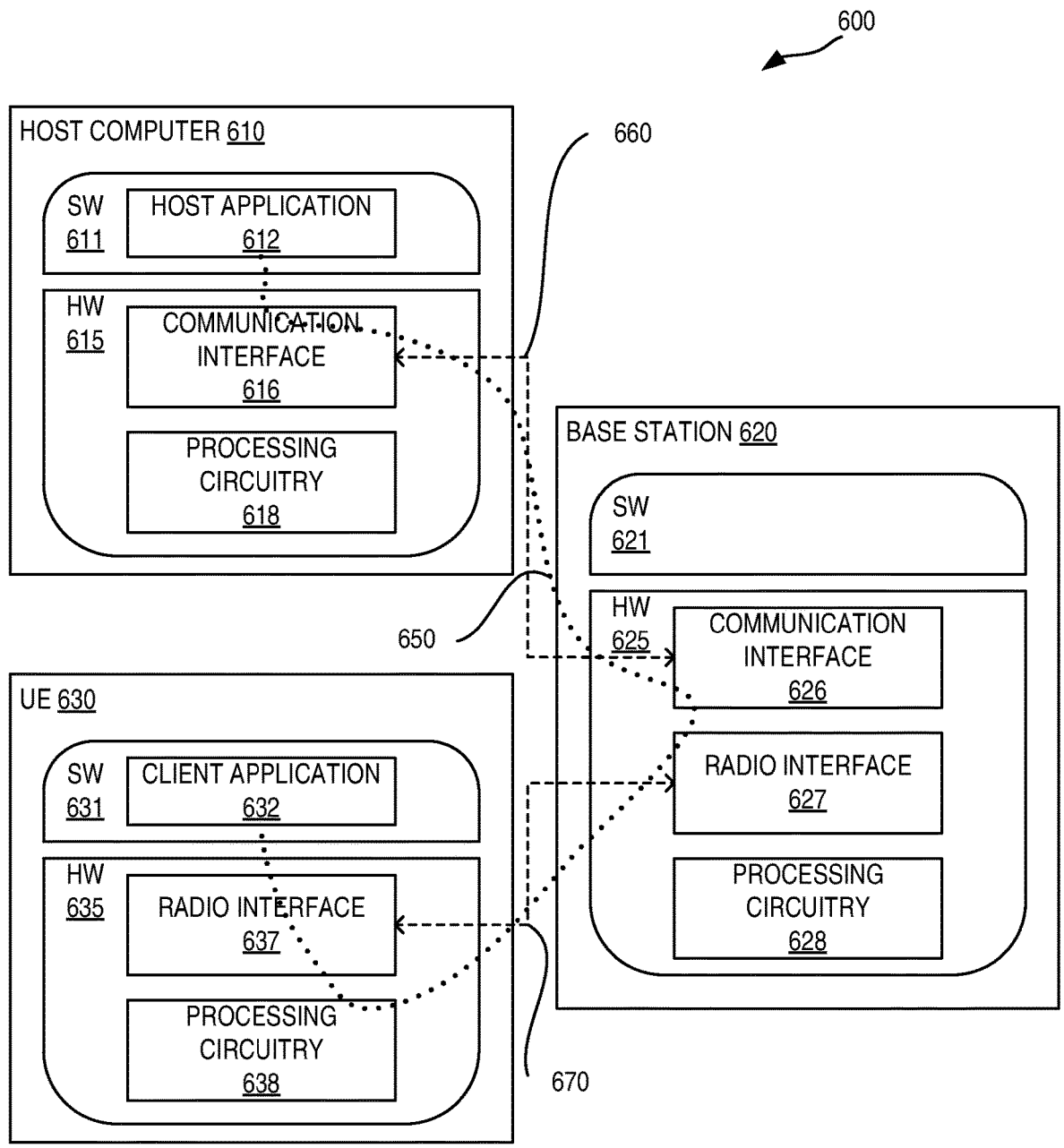
FIG. 6 illustrates an example implementation of the UE, base station, and host computer of FIG. 5.

It is noted that the host computer 610, the base station 620, and the UE 630 illustrated in FIG. 6 may be similar or identical to the host computer 530, one of the base stations 512A, 512B, 512C, and one of the UEs 591, 592 of FIG. 5, respectively. This is to say, the inner workings of these entities may be as shown in FIG. 6 and independently, the surrounding network topology may be that of FIG. 5.

In FIG. 6, the OTT connection 650 has been drawn abstractly to illustrate the communication between the host computer 610 and the UE 630 via the base station 620 without explicit reference to any intermediary devices and the precise routing of messages via these devices. The network infrastructure may determine the routing, which may be configured to hide from the UE 630 or from the service provider operating the host computer 610, or both. While the OTT connection 650 is active, the network infrastructure may further take decisions by which it dynamically changes the routing (e.g., on the basis of load balancing consideration or reconfiguration of the network).

The wireless connection 670 between the UE 630 and the base station 620 is in accordance with the teachings of the embodiments described throughout this disclosure. One or more of the various embodiments improve the performance of OTT services provided to the UE 630 using the OTT connection 650, in which the wireless connection 670 forms the last segment. More precisely, the teachings of these embodiments may improve the performance of EDT and/or CE during RA and thereby provide benefits such as reduced collision rates, improved throughput, and avoiding wasted radio resources and degraded spectral efficiency.

A measurement procedure may be provided for the purpose of monitoring data rate, latency, and other factors on which the one or more embodiments improve. There may further be an optional network functionality for reconfiguring the OTT connection 650 between the host computer 610 and the UE 630, in response to variations in the measurement results. The measurement procedure and/or the network functionality for reconfiguring the OTT connection 650 may be implemented in the software 611 and the hardware 615 of the host computer 610 or in the software 631 and the hardware 635 of the UE 630, or both. In some embodiments, sensors (not shown) may be deployed in or in association with communication devices through which the OTT connection 650 passes; the sensors may participate in the measurement procedure by supplying values of the monitored quantities exemplified above, or supplying values of other physical quantities from which the software 611, 631 may compute or estimate the monitored quantities. The reconfiguring of the OTT connection 650 may include message format, retransmission settings, preferred routing, etc.; the reconfiguring need not affect the base station 620, and it may be unknown or imperceptible to the base station 620. Such procedures and functionalities may be known and practiced in the art. In certain embodiments, measurements may involve proprietary UE signaling facilitating the host computer 610's measurements of throughput, propagation times, latency, and the like. The measurements may be implemented in that the software 611 and 631 causes messages to be transmitted, in particular empty or 'dummy' messages, using the OTT connection 650 while it monitors propagation times, errors, etc.

FIG. 7 is a flowchart illustrating a method implemented in a communication system, in accordance with one embodiment. The communication system includes a host computer, a base station, and a UE which may be those described with reference to FIGS. 5 and 6. For simplicity of the present disclosure, only drawing references to FIG. 7 will be included in this section. In step 710, the host computer provides user data. In sub-step 711 (which may be optional) of step 710, the host computer provides the user data by executing a host application. In step 720, the host computer initiates a transmission carrying the user data to the UE. In step 730 (which may be optional), the base station transmits to the UE the user data which was carried in the transmission that the host computer initiated, in accordance with the teachings of the embodiments described throughout this disclosure. In step 740 (which may also be optional), the UE executes a client application associated with the host application executed by the host computer.

FIG. 8 is a flowchart illustrating a method implemented in a communication system, in accordance with one embodiment. The communication system includes a host computer, a base station, and a UE which may be those described with reference to FIGS. 5 and 6. For simplicity of the present disclosure, only drawing references to FIG. 8 will be included in this section. In step 810 of the method, the host computer provides user data. In an optional sub-step (not shown) the host computer provides the user data by executing a host application. In step 820, the host computer initiates a transmission carrying the user data to the UE. The transmission may pass via the base station, in accordance with the teachings of the embodiments described throughout this disclosure. In step 830 (which may be optional), the UE receives the user data carried in the transmission.

FIG. 9 is a flowchart illustrating a method implemented in a communication system, in accordance with one embodiment. The communication system includes a host computer, a base station, and a UE which may be those described with reference to FIGS. 5 and 6. For simplicity of the present disclosure, only drawing references to FIG. 9 will be included in this section. In step 910 (which may be optional), the UE receives input data provided by the host computer. Additionally or alternatively, in step 920, the UE provides user data. In sub-step 921 (which may be optional) of step 920, the UE provides the user data by executing a client application. In sub-step 911 (which may be optional) of step 910, the UE executes a client application which provides the user data in reaction to the received input data provided by the host computer. In providing the user data, the executed client application may further consider user input received from the user. Regardless of the specific manner in which the user data was provided, the UE initiates, in sub-step 930 (which may be optional), transmission of the user data to the host computer. In step 940 of the method, the host computer receives the user data transmitted from the UE, in accordance with the teachings of the embodiments described throughout this disclosure.

FIG. 10 is a flowchart illustrating a method implemented in a communication system, in accordance with one embodiment. The communication system includes a host computer, a base station, and a UE which may be those described with reference to FIGS. 5 and 6. For simplicity of the present disclosure, only drawing references to FIG. 10 will be included in this section. In step 1010 (which may be optional), in accordance with the teachings of the embodiments described throughout this disclosure, the base station receives user data from the UE. In step 1020 (which may be optional), the base station initiates transmission of the received user data to the host computer. In step 1030 (which may be optional), the host computer receives the user data carried in the transmission initiated by the base station.

Figure 11:
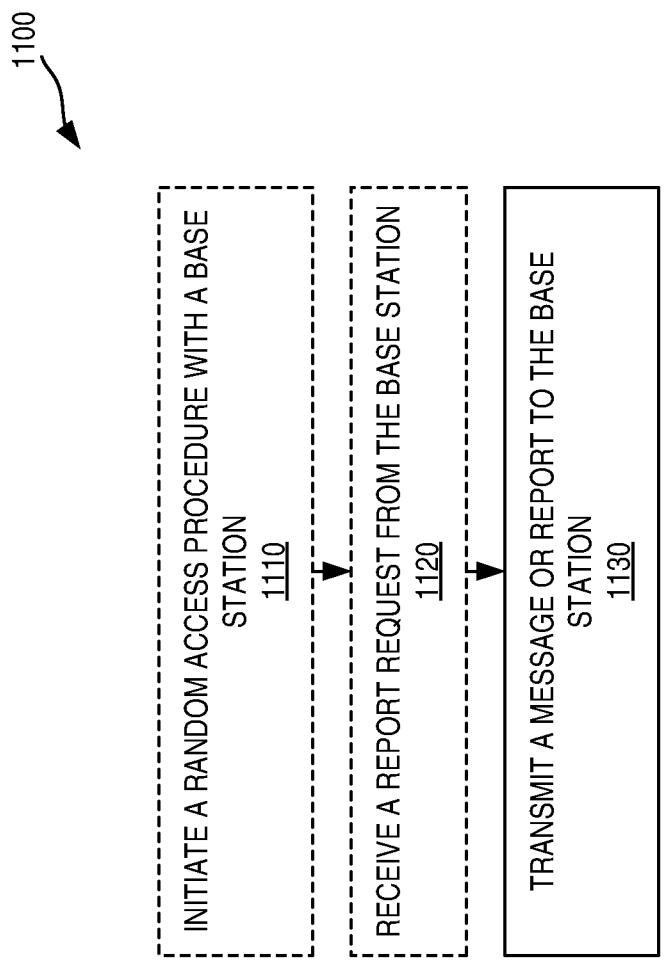
FIG. 11 depicts a method performed by a wireless device for reporting radio conditions during RA in accordance with particular embodiments.

FIG. 11 depicts a method 1100 for reporting radio conditions during RA in accordance with particular embodiments. Dashed boxes represent optional steps. The method 1100 may be performed by a UE (e.g., a wireless device). The method 1100 begins at step 1110 with initiating a RA procedure with a base station. The method 1100 also includes step 1120 with receiving a report request from the base station. The method 1100 also includes step 1130 with transmitting a message or report (e.g., a channel report or RACH report) to the base station in response to the report request. The message or report includes CE information, or EDT information, or both the CE information and the EDT information, as described with respect to any of the embodiments described above.

Figure 12:
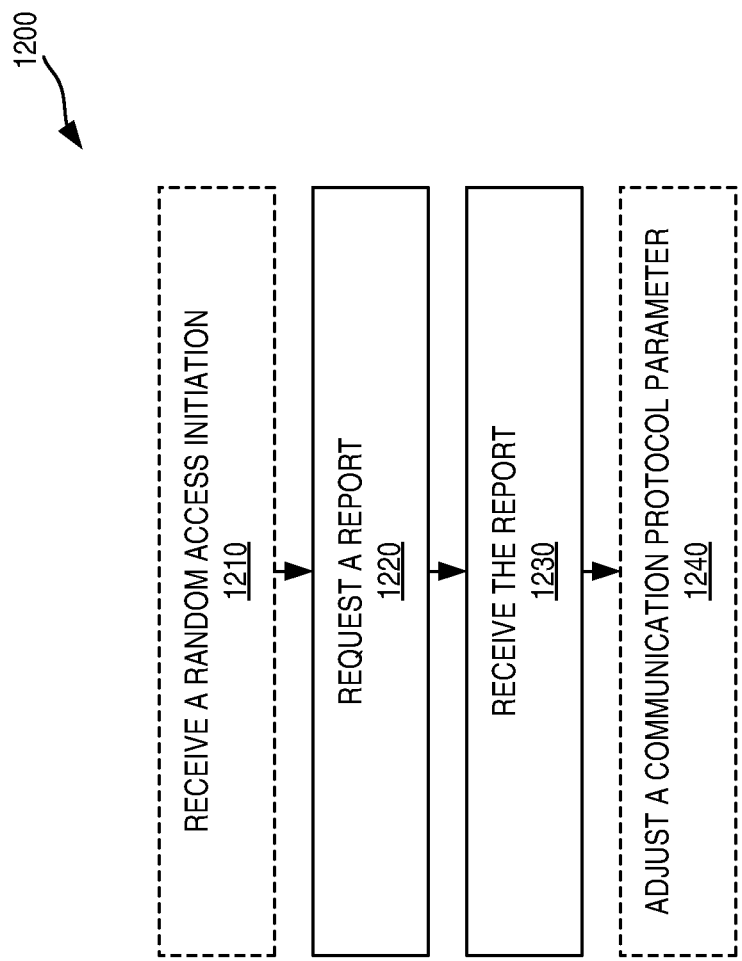
FIG. 12 depicts a method in accordance with particular embodiments.

FIG. 12 depicts a method 1200 in accordance with particular embodiments. Dashed boxes represent optional steps. This method 1200 may be performed by a base station. The method 1200 begins at step 1210 with receiving a RA initiation from a wireless device. The method 1200 also includes step 1220 with requesting a report (e.g., a channel report or RACH report) from the wireless device. The method 1200 also includes step 1230 with receiving the requested report. The report includes CE information, EDT information, or both the CE information and the EDT information, as described with respect to any of the embodiments described above. The method 1200 also includes step 1240 with adjusting a communication protocol parameter based on the CE information, the EDT information, or both the CE information and the EDT information (e.g., increase the size of a particular (N)PRACH partition(s), optimize (e.g., adjust, increase, or decrease) the number of repetitions used by a particular (N)PRACH partition(s), or the like), as described above.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessors or microcontrollers, as well as other digital hardware, which may include DSPs, special-purpose digital logic, and the like. The processing circuitry may be configured to execute program code stored in memory, which may include one or several types of memory such as ROM, RAM, cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices, and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

At least some of the following abbreviations may be used in this disclosure. If there is an inconsistency between abbreviations, preference should be given to how it is used above. If listed multiple times below, the first listing should be preferred over any subsequent listing(s).

3GPP 3rd Generation Partnership Project
2G Second Generation
3G Third Generation
4G Fourth Generation
5G Fifth Generation
AC Alternating Current
AM Acknowledged Mode
AP Access Point
ASIC Application Specific Integrated Circuit
ASN.1 Abstract Syntax Notation One
ATM Asynchronous Transfer Mode
BLER Block Error Rate
BSC Base Station Controller
BTS Base Transceiver Station
CD Compact Disk
CDMA Code Division Multiple Access
CE Coverage Enhancement
CIoT Cellular Internet of Things
COTS Commercial Off-the-Shelf
CP Control Plane
CPE Customer Premise Equipment
CPU Central Processing Unit
D2D Device-to-Device
DAS Distributed Antenna System
DC Direct Current
DCCH Dedicated Control Channel
DIMM Dual In-Line Memory Module
DL Downlink
DoNAS Data over Non-Access Stratum
DSP Digital Signal Processor
DVD Digital Versatile Disk
EDT Early Data Transmission
EEPROM Electrically Erasable Programmable Read Only Memory eMTC Enhanced Machine Type Communication
eNB Enhanced or Evolved Node B
EPROM Erasable Programmable Read Only Memory
EPS Evolved Packet System
E-SMLC Evolved Serving Mobile Location Center
E-UTRAN Evolved Universal Terrestrial Radio Access Network
FPGA Field Programmable Gate Array
GHz Gigahertz
gNB New Radio Node B
GPS Global Positioning System
GSM Global System for Mobile Communications
HDDS Holographic Digital Data Storage
HD-DVD High-Density Digital Versatile Disc
I/O Input and Output
IoT Internet of Things
IP Internet Protocol
LAN Local Area Network
LEE Laptop Embedded Equipment
LME Laptop Mounted Equipment
LTE Long Term Evolution
LTE-M Long Term Evolution for Machine Type Communication
M2M Machine-to-Machine
MANO Management and Orchestration
MCE Multi-Cell/Multicast Coordination Entity
MDT Minimization of Drive Tests
MIMO Multiple Input Multiple Output
MME Mobility Management Entity
MSC Mobile Switching Center
MSR Multi-Standard Radio
MTC Machine Type Communication
NB-IoT Narrowband Internet of Things
NFV Network Function Virtualization
NIC Network Interface Controller
NPRACH Narrowband Physical Random Access Channel
NPUSCH Narrowband Physical Uplink Shared Channel
NR New Radio
O&M Operation and Maintenance
OSS Operations Support System
OTT Over-the-Top
PDA Personal Digital Assistant
PHR Power Headroom Report
PRACH Physical Random Access Channel
PRB Physical Resource Block
PROM Programmable Read Only Memory
PSTN Public Switched Telephone Networks
RA Random Access
RACH Random Access Channel
RAID Redundant Array of Independent Disks
RAM Random Access Memory
RAN Radio Access Network
RAT Radio Access Technology
RF Radio Frequency
RLC Radio Link Control
RNC Radio Network Controller
ROM Read Only Memory
RRC Radio Resource Control
RRH Remote Radio Head
RRU Remote Radio Unit
RSRP Reference Signal Received Power
RUIM Removable User Identity Module
SAP Service Access Point
SDRAM Synchronous Dynamic Random Access Memory
SIM Subscriber Identity Module
SOC System on a Chip
SON Self-Organizing Network
SONET Synchronous Optical Networking
TA Timing Advance
TBS Transport Block Size
TCP Transmission Control Protocol
UE User Equipment
UL Uplink
UP User Plane
USB Universal Serial Bus
UMTS Universal Mobile Telecommunications System
UTDOA Uplink Time Difference of Arrival
UTRAN Universal Terrestrial Radio Access Network
V2I Vehicle-to-Infrastructure
V2V Vehicle-to-Vehicle
V2X Vehicle-to-Everything
VMM Virtual Machine Monitor
VNE Virtual Network Element
VNF Virtual Network Function
VoIP Voice over Internet Protocol
WAN Wide Area Network
WCDMA Wideband Code Division Multiple Access
WD Wireless Device
WI Work Items
WiMax Worldwide Interoperability for Microwave Access
WLAN Wireless Local Area Network Those skilled in the art will recognize improvements and modifications to the embodiments of the present disclosure. All such improvements and modifications are considered within the scope of the concepts disclosed herein.

What is claimed is:

1. A method performed by a wireless device for reporting radio conditions during random access, the method comprising:
transmitting a message or report to a base station, the message or report comprising Coverage Enhancement, CE, information, Early Data Transmission, EDT, information, or both the CE information and the EDT information;
where the report comprises an indication of a collision rate for EDT communications.

2. The method of claim 1 further comprising receiving a report request from the base station, wherein transmitting the message or report comprises transmitting the message or report in response to the report request.

3. The method of claim 2 further comprising initiating a random access procedure with the base station prior to receiving the report request.

4. The method of claim 3, wherein initiating the random access procedure comprises transmitting a number of preamble messages to the base station until the report request is received.

5. The method of claim 4, wherein the message or report comprises the number of preamble messages sent to the base station.

6. The method of claim 2 wherein transmitting the message or report comprises transmitting the message or report after a threshold number of unsuccessful random access attempts.

7. The method of claim 1 wherein the EDT information comprises a number of EDT preamble messages sent to the base station, an indication that an EDT contention with another wireless device is detected, or both the number of EDT preamble messages sent to the base station and the indication that an EDT contention with another wireless device is detected.

8. The method of claim 1 wherein the EDT information is included in the message or report after successfully transmitting an EDT message.

9. The method of claim 1 wherein the CE information comprises a CE level of the wireless device.

10. The method of claim 9 wherein the CE information further comprises a number of preamble messages sent to the base station at the CE level, an indication that a contention with another wireless device is detected at the CE level, or both the number of preamble messages sent to the base station at the CE level and the indication that a contention with another wireless device is detected at the CE level.

11. The method of claim 1 wherein the message or report is a Random Access Channel, RACH, report or a Physical RACH, PRACH, report.

12. The method of claim 1 wherein the message or report comprises Physical Random Access Channel, PRACH, coverage levels attempted before a successful random access attempt.

13. The method of claim 1 wherein the message or report comprises any one or any combination of two or more of:
- a number of Physical Random Access Channel, PRACH, preamble repetitions transmitted to the base station;
- information indicating whether the wireless device has had a previous unsuccessful random access attempt;
- power-class specific information;
- a power headroom report;
- multi-tone specific information;
- Narrowband PRACH, NPRACH, specific information; or
- information related to Radio Resource Control, RRC, Idle Msg1 data transmission in a random access procedure.

14. The method of claim 1 wherein the message or report is a Narrowband Internet of Things, NB-IoT, report.

15. The method of claim 1 wherein the message or report is an Enhanced Machine Type Communication, eMTC, report.

16. A method performed by a base station for improving throughput in response to reported radio conditions during random access, the method comprising:
- requesting a report from a wireless device; and
- receiving the report from the wireless device, the report comprising Coverage Enhancement, CE, information, Early Data Transmission, EDT, information, or both the CE information and the EDT information;
- where the report comprises an indication of a collision rate for EDT communications.

17. The method of claim 16, further comprising adjusting a communication protocol parameter based on the CE information, the EDT information, or both the CE information and the EDT information.

18. A wireless device for reporting radio conditions during random access, the wireless device comprising processing circuitry and memory, where the processing circuitry is adapted to execute instructions stored on the memory to transmit a message or report to a base station, the message or report comprising Coverage Enhancement, CE, information, Early Data Transmission, EDT, information, or both the CE information and the EDT information;
where the report comprises an indication of a collision rate for EDT communications.

19. A base station for improving throughput in response to reported radio conditions during random access, the base station adapted to:
- request a report from a wireless device; and
- receive the report from the wireless device, the report comprising Coverage Enhancement, CE, information, Early Data Transmission, EDT, information, or both the CE information and the EDT information;
- where the report comprises an indication of a collision rate for EDT communications.

* * * * *